(12) United States Patent
Takagi et al.

(10) Patent No.: US 7,245,827 B2
(45) Date of Patent: Jul. 17, 2007

(54) IMAGE RECORDING APPARATUS

(75) Inventors: Junichi Takagi, Asaka (JP); Mutsumi Naruse, Asaka (JP); Yukitaka Takeshita, Asaka (JP)

(73) Assignee: Fujifilm Corporation, Tokyo (JP)

( * ) Notice: Subject to any disclaimer, the term of this patent is extended or adjusted under 35 U.S.C. 154(b) by 77 days.

(21) Appl. No.: 11/151,703

(22) Filed: Jun. 14, 2005

(65) Prior Publication Data
US 2005/0286878 A1 Dec. 29, 2005

(30) Foreign Application Priority Data
Jun. 14, 2004 (JP) .............................. 2004-175057
Sep. 10, 2004 (JP) .............................. 2004-263744

(51) Int. Cl.
*G03B 17/50* (2006.01)
(52) U.S. Cl. .............................. 396/33; 396/38; 396/40
(58) Field of Classification Search .................. 396/33, 396/38, 40, 583
See application file for complete search history.

(56) References Cited
U.S. PATENT DOCUMENTS
3,896,469 A * 7/1975 Mather ........................ 396/33
4,200,382 A * 4/1980 Friedman ..................... 396/33
5,032,911 A * 7/1991 Takimoto .................... 358/501
6,317,561 B1 11/2001 Kniazzeh et al.

FOREIGN PATENT DOCUMENTS
JP 3271048 B2 1/2002
JP 2002-221761 A 8/2002

* cited by examiner

*Primary Examiner*—D. Rutledge
(74) *Attorney, Agent, or Firm*—Sughrue Mion, PLLC

(57) ABSTRACT

An image recording apparatus has a pack chamber loaded with an instant film pack which stores by stacking plural pieces of instant film sheets having an image recording section which is exposed and subjected to spreading of a developer to record an image and a developer pool provided on a front end side in a carrying direction from the image recording section, and that carries the instant film sheets stored in the instant film pack loaded in the pack chamber and that performs recording of the image on the instant film sheets, the image recording apparatus comprising: carrying rollers; an exposure section; developing rollers; a carrying roller holding section; and a developing roller holding section.

7 Claims, 30 Drawing Sheets

IMAGE RECORDING APPARATUS

BACKGROUND OF THE INVENTION

1. Field of the Invention

The present invention relates to an image recording apparatus having a pack chamber loaded with an instant film pack which stores by stacking plural pieces of instant film sheets, which have a developer pool at a tip portion in a predetermined carrying direction, which have a latent image formed thereon by exposure, and which record an image visualized by subjecting the latent image to spreading of the developer in the developer pool, and carrying the instant film sheets stored in the instant film pack loaded in the pack chamber, and performing image recording on the instant film sheets.

2. Description of the Related Art

In the prior art, as an image recording apparatus described above, there is known a printer which records an image on an instant film sheet. A printer of this type is provided with a pack chamber loaded with an instant film pack in which plural pieces of instant film sheets are stacked and stored, a film door openably covering the pack chamber, and a display section which displays the number of remaining sheets in the loaded instant film pack. Recording of an image on the instant film sheet is performed by raking up by a claw the first instant film sheet of the instant film sheets in the pack chamber and carrying the instant film sheet by clamping with a pair of carrying rollers, irradiating to the instant film sheet three color lights in turn from a light emitting element having light emitting colors of red (R), green (G) and blue (B) to write a latent image on the instant film sheet, and then crushing by a pair of developing rollers a developer pool provided for the instant film sheet to spread the developer (for example, refer to Japanese Patent Laid-Open No. 2002-221761, U.S. Pat. No. 6,317,561B1).

In order to accurately and surely carry the instant film sheet, there is also proposed carrying rollers which carry the instant film sheet, and which is provided with protrusions at the portions corresponding to both end portions of the instant film sheet except the developer pool (refer to U.S. Pat. No. 3,271,048).

The printer disclosed in Japanese Patent Laid-Open No. 2002-221761 described above is provided with a total of four rollers including a pair of carrying rollers and a pair of developing rollers, which causes components for incorporating the four rollers to have a complicated structure for holding the rollers and springs pressing the rollers, and a metal mold for manufacturing such components also to be complicated, which is disadvantageous in cost.

Further, there is a demand for miniaturizing the printer as a whole. To this end, it is necessary to use small-diameter rollers, and to reduce the interspace between the carrying rollers and the developing rollers, which requires the extremely high accuracy of components and in assembling in order to excellently spread the developer.

Further, in the printer proposed in U.S. Pat. No. 6,317,561B1 described above, the portion of the carrying roller corresponding to both end portions of the instant film has a relatively large width size. For this reason, a large margin portion of the instant film sheet except a space (image forming area) for storing the developer with a predetermined thickness is needed in carrying the instant film, thereby making the use of an instant film sheet with a small size difficult. As s result, there is a problem that it is difficult to realize a thin and small printer.

Further, the carrying roller proposed in U.S. Pat. No. 3,271,048 described above is provided with protrusions in portions corresponding to both end portions of the instant film sheet, thereby enabling the instant film sheet to be accurately and surely carried. Thus, when a latent image is written on the instant film sheet by a light emitting element while the instant film sheet being carried, it is possible to prevent a striped unevenness in the image from being produced by the deviation in the timing of printing based on the fluctuation in feeding accuracy of the instant film sheet. However, since this carrying roller has plural spike-like protrusions formed by a punch unit on the peripheral surface of a metallic round rod, the feeding pitch of the carrying roller for carrying the instant film sheet is large, resulting in a state where an intermittent feeding occurs when an instant film sheet having a small size is used. Thus, it is difficult to apply the carrying roller of this type for a thin and small printer.

The present invention has been made in view of the above-described circumstances and provides an image recording apparatus in which the reduction of component costs and the improvement of accuracy are achieved in a printer having carrying and developing rollers.

The present invention also provides an image recording apparatus which is capable of suppressing the irregular feed of a recording medium to a small extent and which has a thin and small structure.

SUMMARY OF THE INVENTION

The present invention has been made in view of the above circumstances and provides an image recording apparatus.

Of image recording apparatuses according to the present invention, there is provided a first image recording apparatus that has a pack chamber loaded with an instant film pack storing by stacking plural pieces of instant film sheets having an image recording section which is exposed and subjected to spreading of a developer to record an image, and a developer pool provided on the front end side in the carrying direction from the image recording section, and that carries the instant film sheets stored in the instant film pack loaded in the pack chamber and performs recording of the image on the instant film sheets, the image recording apparatus having:

carrying rollers carrying an instant film sheet taken out from the instant film pack loaded in the pack chamber;

an exposure section exposing the instant film sheet being carried by the carrying rollers;

developing rollers provided on a downstream side in the carrying direction from the carrying rollers, crushing the developer pool of the instant film sheet being carried and spreading the developer over the image recording section;

a carrying roller holding section receiving and holding the carrying rollers; and a developing roller holding section that receives and holds the developing rollers and that is constituted by a second component separate from a first component constituting the carrying roller holding section, the second component being fixed to the first component.

The first image recording apparatus according to the present invention, in which the first component constituting the carrying roller holding section and the second component constituting the developing roller holding section are produced as separate components and fixed with each other, makes it possible to simplify the structure of the components and to reduce the costs. The first image recording apparatus also makes it possible to prevent the shape of components from becoming complicated, thereby increasing the accuracy after assembly.

Here, in the first image recording apparatus according to the present invention, the above-described first component may be a component constituting the carrying roller holding section and the pack chamber.

The carrying roller is arranged on the side of the pack chamber from the developing roller. When the carrying roller holding section and the developing roller holding section are produced as an integral component, the structure becomes too complicated, but there is no specific problem in combining the carrying roller holding section and the pack chamber, and the number of components can be reduced by constituting the carrying roller holding section and the pack chamber as one component.

The first image recording apparatus according to the present invention may also be provided with a control plate which is positioned between the carrying roller and the developing roller, and which is in contact with the instant film sheet being carried and controls the spreading of the developer, and which is fixed to the second component.

As described above, the carrying roller holding section and the developing roller holding section are constituted as separate components, so that the control plate which controls the spreading of the developer can be provided with a high positional accuracy between the carrying rollers and the developing rollers, thereby enabling the developer to be stably spread.

As described above, according to the first image recording apparatus of the present invention, it is possible to reduce component costs and to increase the accuracy in assembling.

Of image recording apparatuses according to the present invention which achieve the above-described objects, there is provided a second image recording apparatus that writes a latent image by photoirradiation in a recording medium which has a developer pool at a tip portion in a predetermined carrying direction, on which the latent image is formed by exposure and which records an image visualized with the latent image subjected to spreading of the developer in the above-described developer pool, and that performs development by crushing the developer pool and spreading the developer, the second image recording apparatus having:

a pair of carrying rollers carrying the recording medium by clamping both side portions of the recording medium; and a pair of developing rollers which are arranged on a downstream side in the carrying direction from the pair of carrying rollers, and which clamps the whole width of the recording medium and crushes the developer pool to spread the developer, at least one of the pair of carrying rollers having a surface shape in which a first protruding portions having a predetermined height are distributed, and in which a second protruding portions having a height smaller than that of the first protruding portions and a volume larger than that of the first protruding portions are distributed between the respective first protruding portions.

In the second image recording apparatus according to the present invention, since the first protruding portions constituting at least one of the pair of carrying rollers are distributed, as compared with the case where the first protruding portions are uniformly arranged, it is prevented that the interspace between the first protruding portions is made to be too small and the first protruding portions per unit area are increased so that a load applied to the first protruding portions under a constant pressurization is distributed and reduced to make the first protruding portions difficult to be stuck into the recording medium and the carrying performance lowered, as a result of which the recording medium can be surely and accurately carried by each of the first protruding portions. In addition, since the second protruding portions of which height is lower than that of the first protruding portions are distributed between the respective first protruding portions, it is possible to surely and accurately carry the recording medium by the first protruding portions while receiving the recording medium by the second protruding portions.

Further, since the volume of the second protruding portions is made larger than that of the first protruding portions, even for a carrying roller having a portion protruded in collar shape, the first and second protruding portions can be formed on the portion protruded in collar shape with a deformation amount suppressed to a small value, by a rolling metal mold as will be described in relation to an embodiment. Thus, the width size of the portion of the carrying roller, which clamps both side portions of the recording medium, can be limited to a small value, thereby enabling the recording medium with a small size to be used. As s result, it is possible to suppress the irregular feed of the recording medium to a small extent, and to provide a printer having a thin and small structure.

In this case, it is preferred that the first protruding portion has a tapered shape.

In this manner, since the recording medium can be carried in a state of being stuck with the first protruding portions, the recording medium can be accurately and surely carried.

It is also preferred that the second protruding portion has a sharp tip truncated shape.

In this manner, since the recording medium can be carried in a state of being stuck with the first protruding portions while being received by the sharp tip truncated shape of the second protruding portions, the recording medium can be further accurately and surely carried.

In addition, at least one of the pair of the developing rollers preferably has a surface shape in which the first protruding portions having a predetermined height are distributed in the portion clamping both end portions of the recording medium, and in which the second protruding portions having a height lower than that of the first protruding portions and a volume larger than that of the first protruding portions are distributed between the respective first protruding portions.

The provision of such developing rollers makes it possible to suppress the irregular feed of the recording medium to a small extent, as in the case of the carrying rollers. In addition, the first and second protruding portions of this kind can be preferably formed by a rolling metal mold, and it is not necessary to perform complicated control and processing steps of abrasive grains, as compared with the case where the protruding and recessed portions are formed on the developing rollers by sand blasting, as a result of which the working process of the developing roller can be simplified and the cost can be reduced.

As described above, according to the second image recording apparatus of the present invention, it is possible to provide an image recording apparatus which suppresses the irregular feed of the recording medium to a small extent, and which has a thin and small structure.

BRIEF DESCRIPTION OF THE DRAWINGS

Preferred embodiments of the present invention will be described in detail based on the following figures, wherein.

DETAILED DESCRIPTION OF THE INVENTION

Embodiments according to the present invention will be described below.

Figure 1:
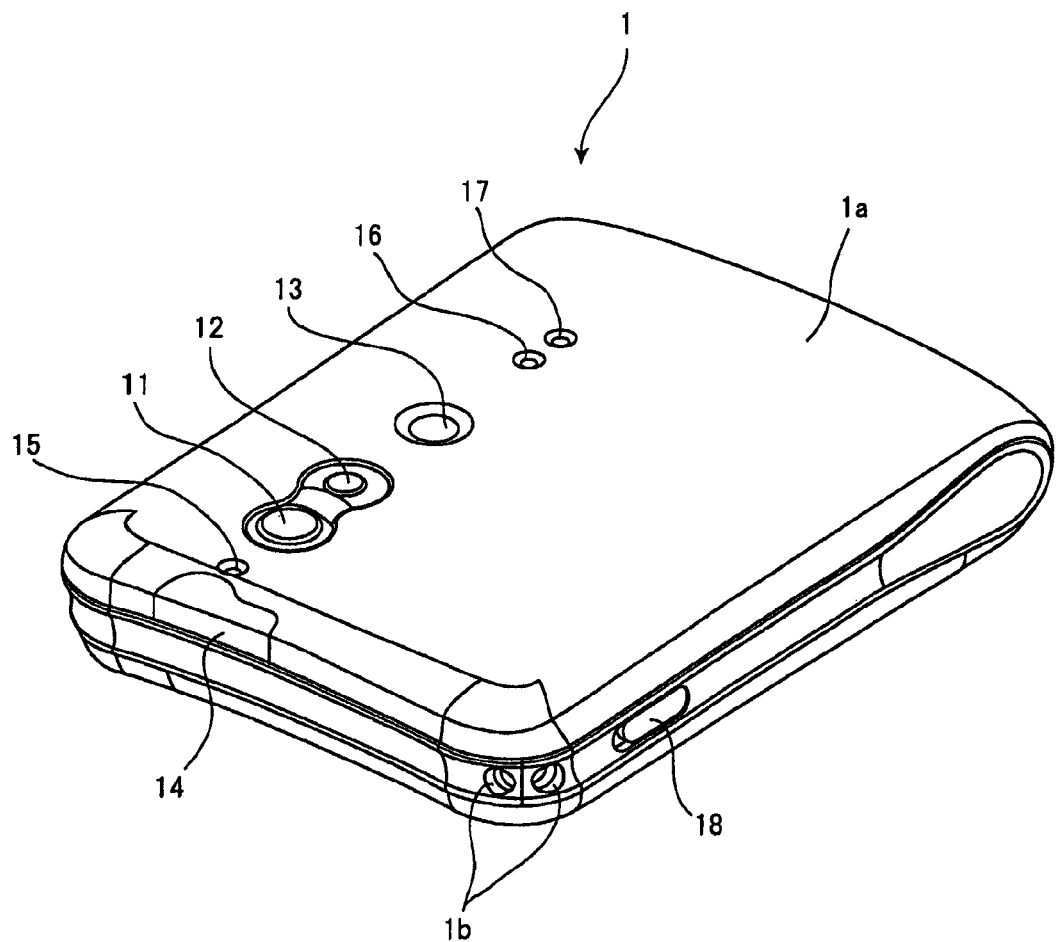
FIG. 1 is a perspective view showing a printer seen slantingly from above, which is an embodiment of an image recording apparatus according to the present invention.

FIG. 1 is a perspective view showing a printer seen slantingly from above, which is an embodiment of an image recording apparatus according to the present invention.

This printer 1, which is used in combination with a portable phone etc., has a pack chamber loaded with an instant film pack which stores by stacking plural pieces of instant film sheets (here described as 10 sheets) on which latent images are formed by exposure and which are then subjected to spreading of a developer to visualize the latent images, and subjects the instant film sheet to exposure in accordance with image data and spreads the developer over the instant film sheet while sending it to the outside. The instant film sheet corresponds to an example of the recording medium according to the present invention.

The portable phone includes a type which is capable of performing infrared communication based on IrDA (Infrared Data Association) and transmitting its own information to the other information apparatus using the infrared communication. In the case where the portable phone is a type provided with camera in addition to the communication function, image data can be transmitted to the printer 1. When image data representing an image photographed by the portable phone with camera or image data transmitted to the portable phone by a mail, etc. are transmitted to the printer 1 using the infrared communication, the printer 1 records on an instant film sheet based on the image data, and also performs re-recording of the image based on the transmitted image data on another instant film sheet by a simple operation of operating a repeat switch (as will be described below), without retransmission from the portable phone being performed.

This printer 1 is a portable type printer having a thin, light and small structure as shown in FIG. 1, and has two built-in 3 V primary batteries. An instant film pack is loaded in a casing 1a of the printer 1, and an image is recorded on the stacked 10 instant film sheets in the instant film pack by one sheet at a time.

On the top surface of the casing 1a of the printer 1 as an operation button, there are provided a power supply switch (hereafter described as power supply SW) 11 which instructs the turning on and off of power supply of the printer 1, and a repeat switch (hereafter described as repeat SW) 12 for performing re-recording of an image based on transmitted image data. A counter 13 which shows the number of remaining sheets of the instant film sheets is also provided on the top surface of the casing 1a. The counter 13 is a mechanical counter, the detail of which will be described below, displays the numeral "10" which indicates that the number of remaining sheets is 10, at the time when an unused instant film pack is loaded and the power supply is turned on. Thereafter, the counter 13 displays a numeral indicating the number of remaining sheets which is decremented by one each time an image is recorded on an instant film sheet, and displays the numeral "0" which indicates the number of remaining sheets is 0, when an image has been recorded on the tenth instant film sheet.

A transceiver section 14 is also provided for an end portion of the printer 1. The transceiver section 14 receives image data transmitted by the above-described infrared communication and transmits a signal informing the other party of the reception of the image data.

Further, for the casing 1a of the printer 1, there are provided an LED for power supply 15 which lights up while the power supply is turned on and which blinks while the infrared communication is performed an LED 16 for communication error which blinks when an error has occurred at the time of infrared communication, and an LED 17 for low battery display which lights up to prompt the user for battery exchange in the case where the voltage of the built-in battery has dropped.

Further, there is provided for a side face of the printer 1 a film door opening switch 18 to open a film door (as will be described below) which is provided for the bottom face side of the printer 1, and a strap attaching section 1b is provided for a corner part.

Figure 2:
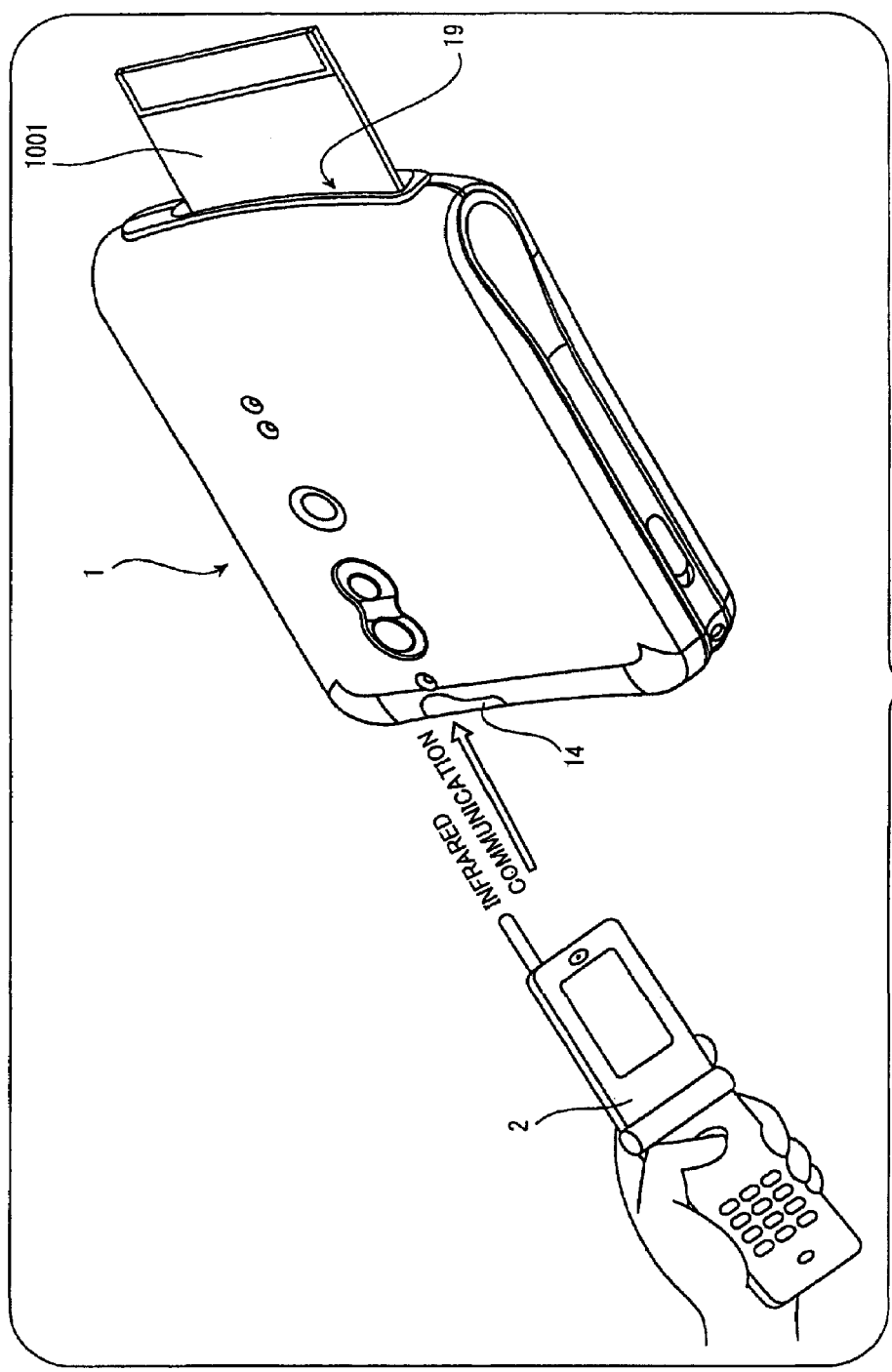
FIG. 2 is a figure showing a situation in the printer shown in FIG. 1, where an instant film sheet with an image recorded thereon based on image data from a portable phone with camera is discharged.

FIG. 2 is a figure showing a situation where an instant film sheet with an image recorded thereon based on image data from a portable phone with camera is discharged, in the printer shown in FIG. 1.

In a state where the infrared communication section of the portable phone with camera 2 is directed toward the transceiver section 14 of the printer 1, the portable phone with camera 2 is operated to transmit image data representing an image photographed by the portable phone with camera 2 to the printer 1 using the infrared communication. The printer 1 receives the image data transmitted by the infrared communication, and performs recording of a latent image based on the received image data on the instant film sheet 1001 by exposure, and develops the instant film sheet 1001, while gradually discharging it to the outside from a feeding out port 19 of the printer 1. Then, also when the repeat SW 12 is operated, re-recording of the same image as the received image is performed on another instant film sheet.

Figure 3:
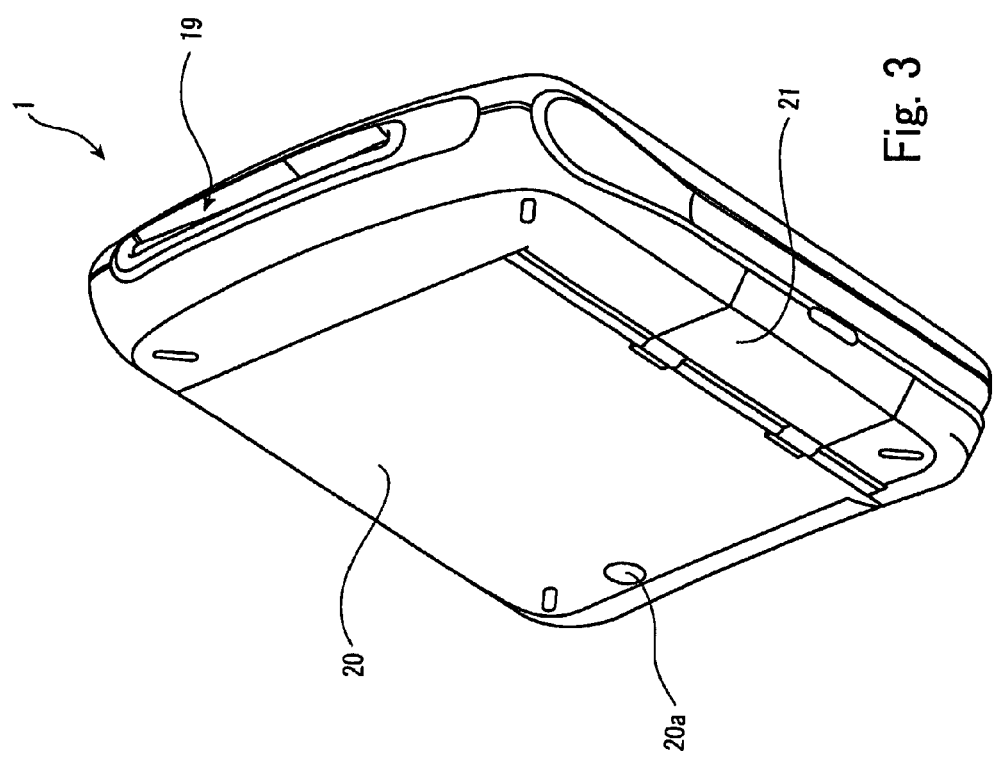
FIG. 3 is a perspective view of the bottom face side of the printer shown in FIG. 1 seen from a slant upper location.

FIG. 3 is a perspective view of the bottom face side of the printer shown in FIG. 1, seen from a slant upper location.

For the bottom face side of the printer 1, there is provided a film door 20 which is opened by the operation of the film door opening switch 18 shown in FIG. 1, and the film door 20 is opened to load the instant film pack in the pack chamber. The film door 20 is also provided with a pack confirmation window 20a to confirm whether the instant film pack is loaded or not. Further, a battery lid 21 which is opened to mount the battery used as the power supply of the printer 1 is provided adjacent the film door 20.

Figure 4:
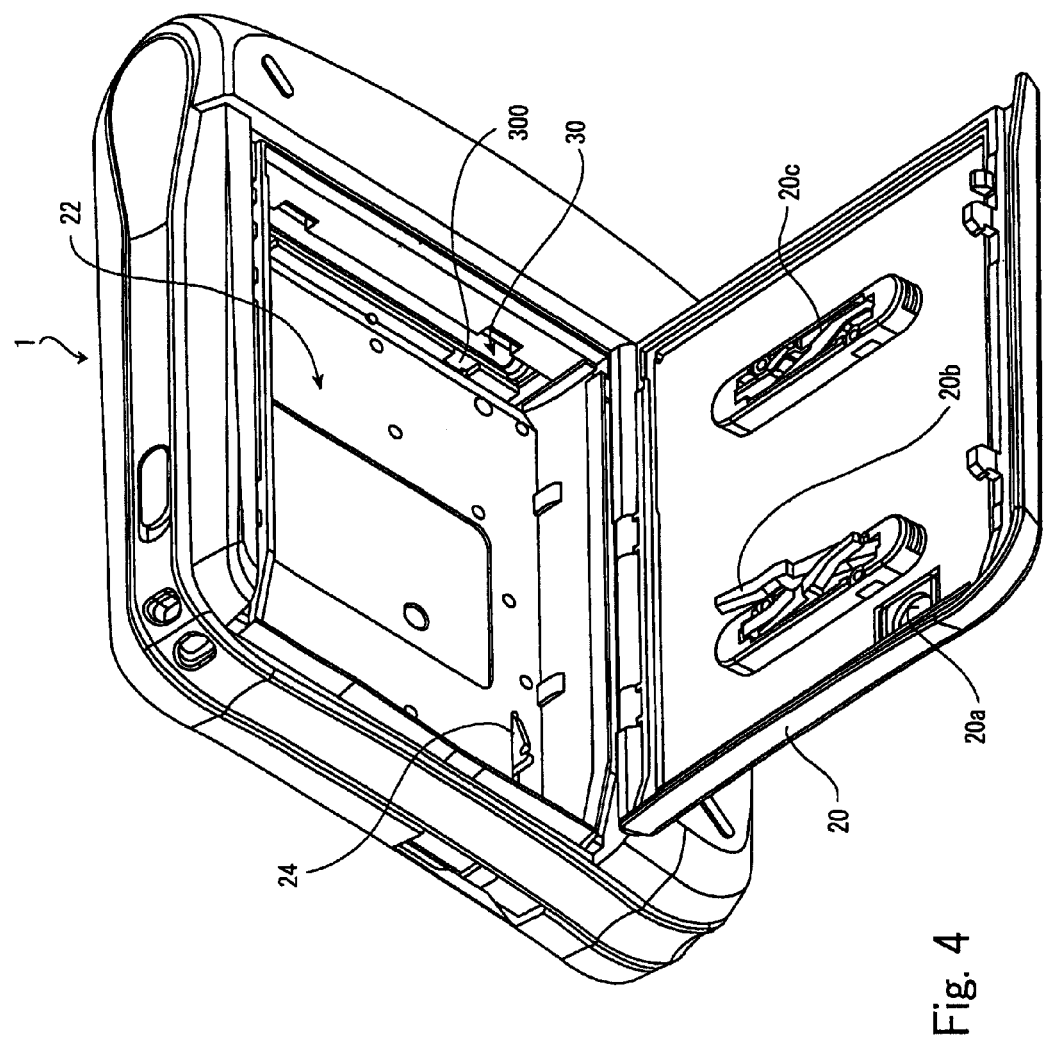
FIG. 4 is a perspective view showing a situation where a film door of the printer shown in FIG. 3 is opened.

FIG. 4 is a perspective view showing a situation where the film door of the printer shown in FIG. 3 is opened.

Inside the film door 20, the pack confirmation window 20a described above and spring members 20b, 20c are provided, by which the instant film sheets stacked in the instant film pack are pressed to the top face side of the printer 1.

A pack chamber 22 in which the instant film pack is loaded is also provided for the printer 1. An image writing section 300 which writes an image on the instant film sheet being carried and a medium carrying and developing section 30 are provided for the right side in FIG. 4, outside the pack chamber 22. The details of the image writing section 300 and the medium carrying and developing section 30 will be described below. A claw 24 for sending out the instant film sheet to the side of the image writing section 300 and the medium carrying and developing section 30 is also provided for the lower side in FIG. 4, in the pack chamber 22. With the above-described structure, the top instant film sheet on the top face side of the printer 1 of the instant film sheets in the instant film pack is raked up by the claw 24. Then, the instant film sheet, on which an image is written by the image writing section 300, is developed, while being carried by the medium carrying and developing section 30.

Figure 5:
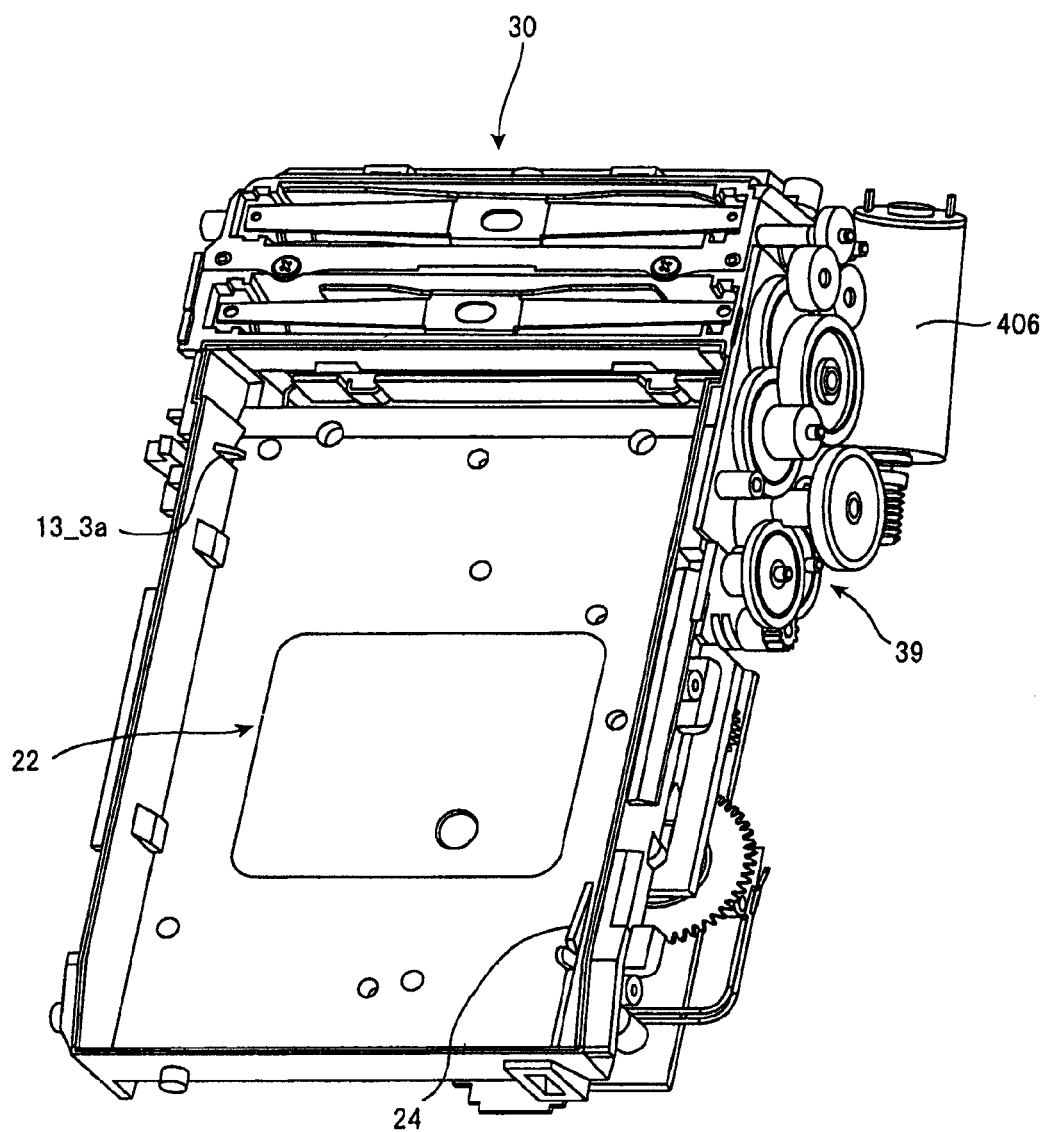
FIG. 5 is a perspective view showing a situation where a casing of the printer shown in FIG. 4 is removed.

FIG. 5 is a perspective view showing a situation where the casing of the printer shown in FIG. 4 is removed.

In FIG. 5, there are shown a d.c. motor 406 and the medium carrying and developing section 30 provided with a gear train 39 which transmits the rotational drive force from the d.c. motor 406 to carrying rollers and developing rollers (as will be described below). In FIG. 5, there are also shown the claw 24 provided in the pack chamber 22 and a rib 13_3a of a counter lever (as will be described below), which is pressed by loading of the instant film pack.

Figure 6:
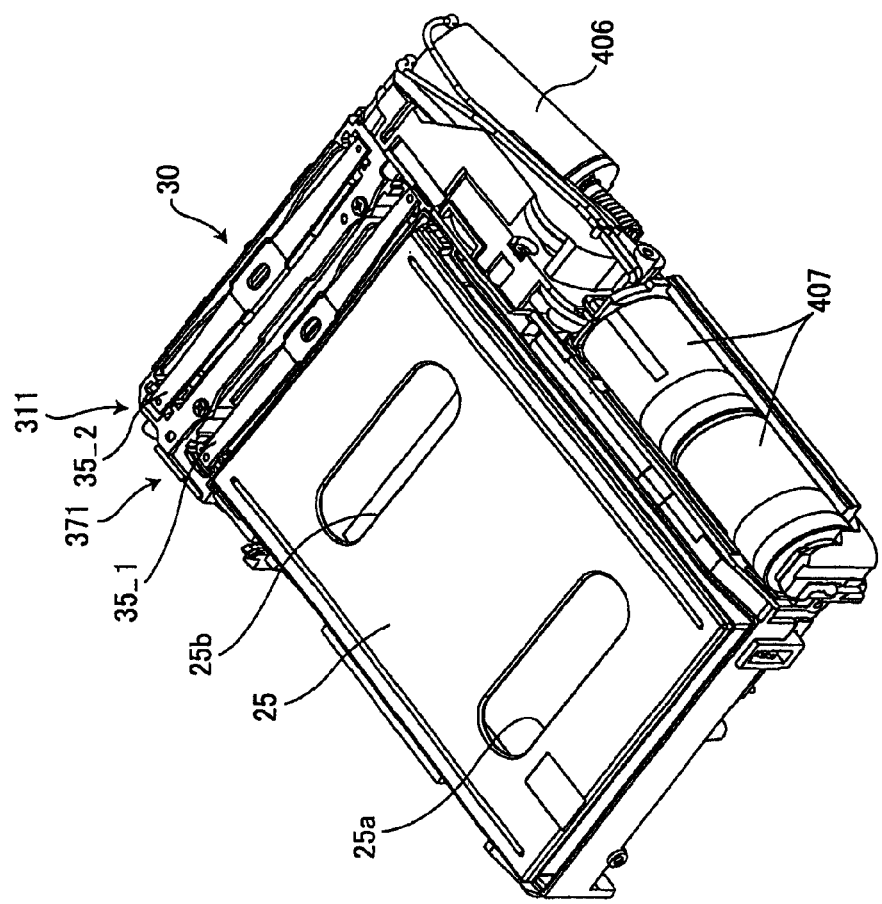
FIG. 6 is a perspective view showing a situation where the casing is removed and a gear train is covered with a cover.
Figure 7:
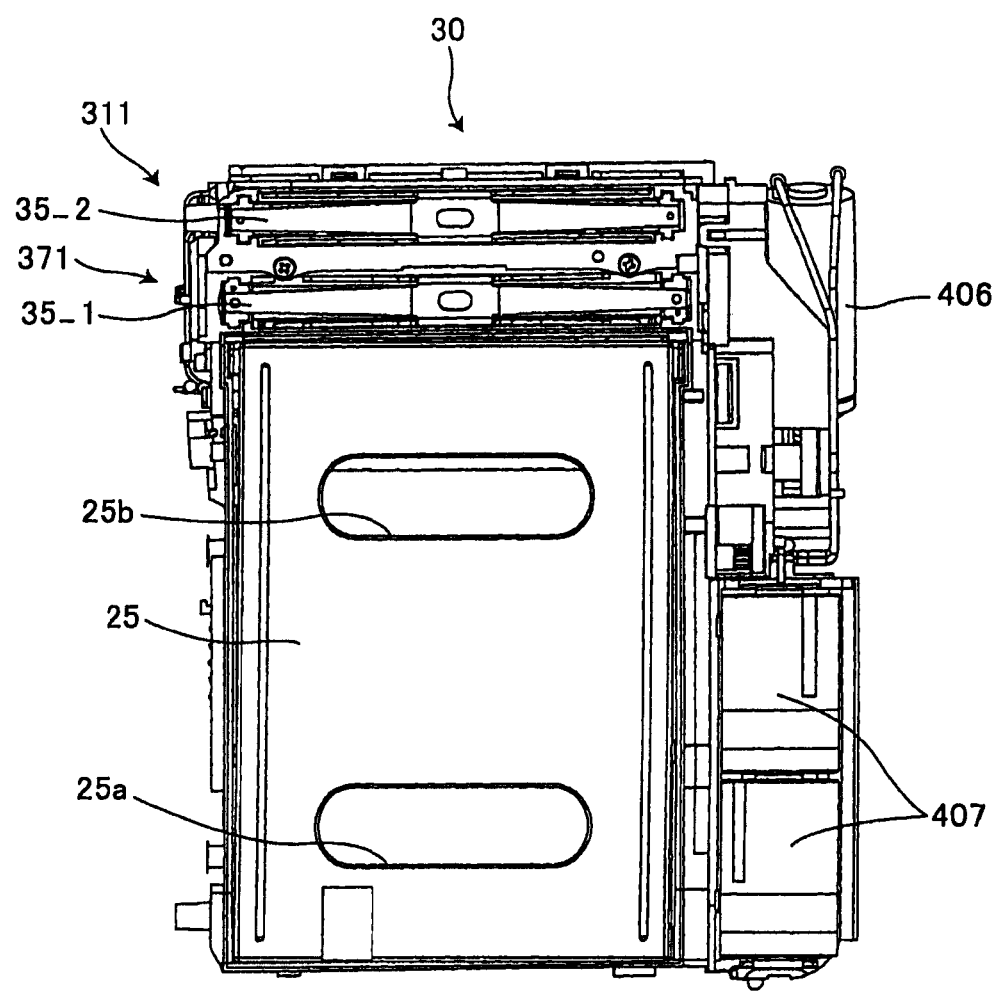
FIG. 7 is a top view showing a situation where the casing is removed and the gear train is covered with the cover.

FIG. 6 is a perspective view showing a situation where the casing is removed and the gear train 39 (refer to FIG. 5) is covered with a cover, and FIG. 7 is a top view in the same situation.

In FIG. 6 and FIG. 7, there are shown two primary batteries 407 arranged within the battery lid 21 (refer to FIG. 3) provided for the casing, and also a situation where the pack chamber 22 (refer to FIG. 5) is loaded with the instant film pack 25. The rear face of the instant film pack 25 is also shown in FIG. 6 and FIG. 7, and two openings 25a, 25b are formed in the rear face. The spring members 20b, 20c, shown in FIG. 4, provided for the film door 20, enter the openings 25a, 25b, and press the instant film sheets stored in a stacked state in the instant film pack 25 toward the front face side.

The medium carrying and developing section 30 has a carrying roller holding section 371 and a developing roller holding section 311. A pair of carrying rollers (as will be described below) are held in the carrying roller holding section 371, and one of the carrying rollers is urged by a spring member 35_1 towards the other carrying roller. Likewise, a pair of developing rollers (as will be described below) are held in the developing roller holding section 311, and one of the developing rollers is urged by a spring member 35_2 towards the other developing roller.

Figure 8:
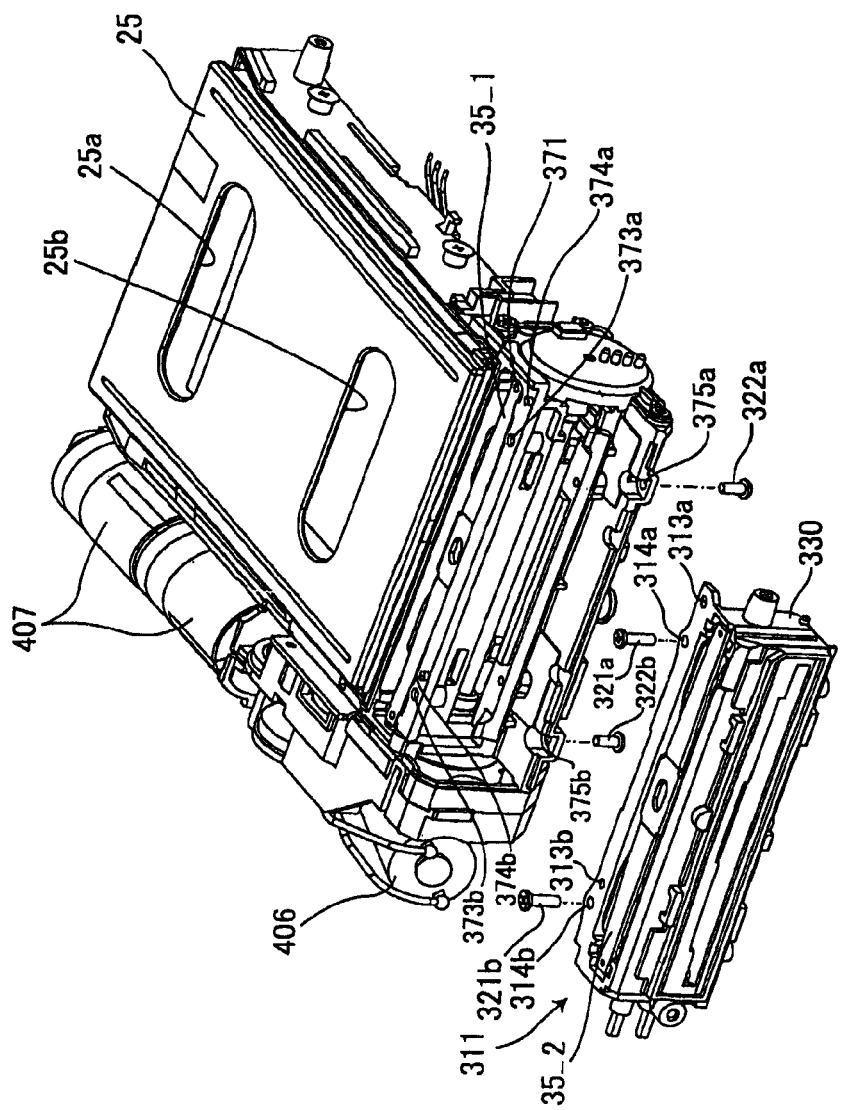
FIG. 8 is an exploded perspective view showing a situation where a carrying roller holding section and a developing roller holding section are separated.

FIG. 8 is an exploded perspective view showing a situation where the carrying roller holding section and the developing roller holding section are separated.

The carrying roller holding section 371 is provided with a resin component which receives and holds the carrying rollers, which resin component also forms the pack chamber 22 (refer to FIG. 5) in which the instant film pack 25 is received. On the other hand, the developing roller holding section 311 is provided with a resin component separated from the resin component which forms the carrying roller holding section 371 and the pack chamber 22.

The developing roller holding section 311 is constituted separately as shown in FIG. 8, and fixed to the carrying roller holding section 371 with screws. That is, two positioning bosses 374a, 374b are provided for the carrying roller holding section 371, and the developing roller holding section 311 is assembled into the carrying roller holding section 371, in which state the two positioning bosses 374a, 374b are fitted in the two positioning holes 313a, 313b of the developing roller holding section 311, and two screws 321a, 321b are inserted into mounting holes 314a, 314b of the developing roller holding section 311, and fixed to screw holes 373a, 373b of the carrying roller holding section 371 with screws. Other two screws 322a, 322b are also inserted into two mounting holes 375a, 375b of the carrying roller holding section 371, and fixed to two screw holes 314a, 314b (refer to FIG. 12 to FIG. 14) of the developing roller holding section 311 with screws. The developing roller holding section 311 is made to be integral with the carrying roller holding section 371 by such screwing operation.

Thus, the developing roller holding section 311 is assembled into the resin component separate from the resin component constituting the carrying roller holding section 371 and the pack chamber 22, so that the structure of such resin components can be simplified and their component costs can be reduced. The structure, in which the developing roller holding section 311 is assembled into the carrying roller holding section 371 after the carrying roller holding section 371 and the developing roller holding section 311 have been respectively assembled as a unit, makes it possible to easily assemble the respective units and to reduce the cost in this respect. Further, the structure makes it possible to prevent the form of the resin components from becoming complicated, and thereby to increase the accuracy after assembly.

Figure 9:
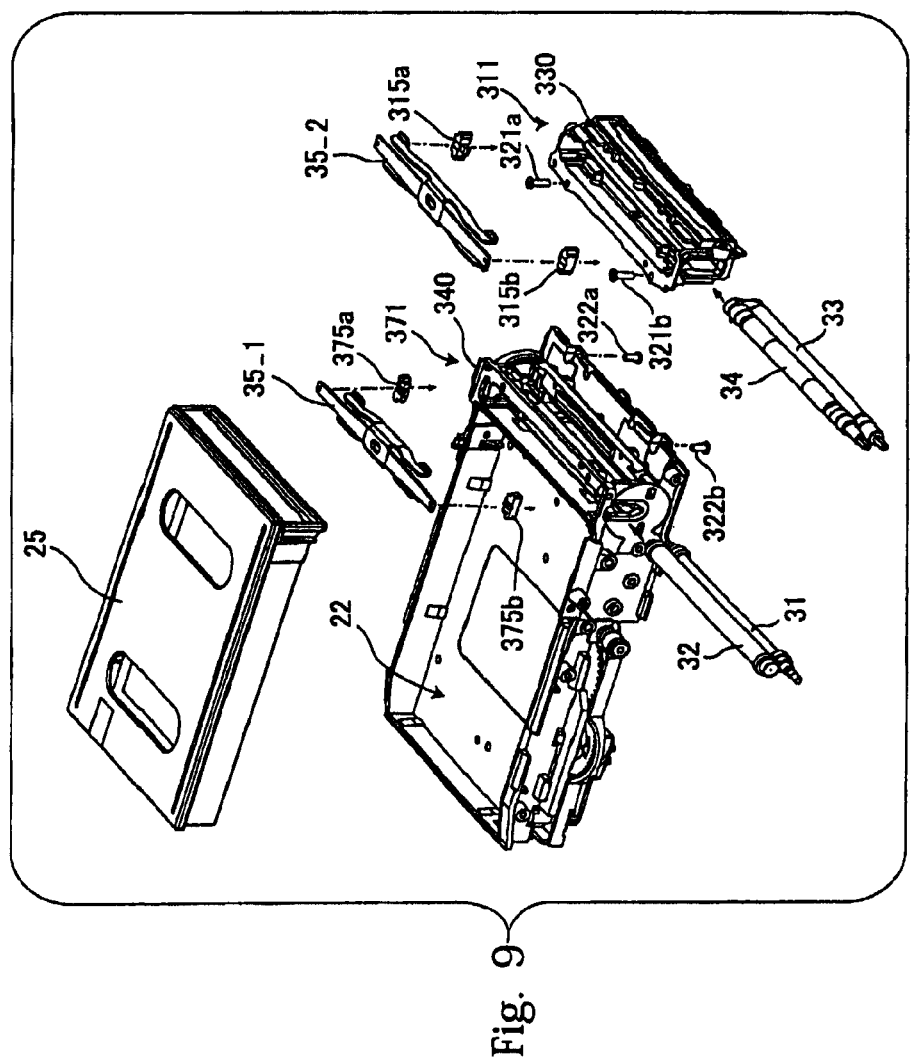
FIG. 9 is an exploded perspective view showing the carrying roller holding section and the developing roller holding section, which are further disassembled.
Figure 10:
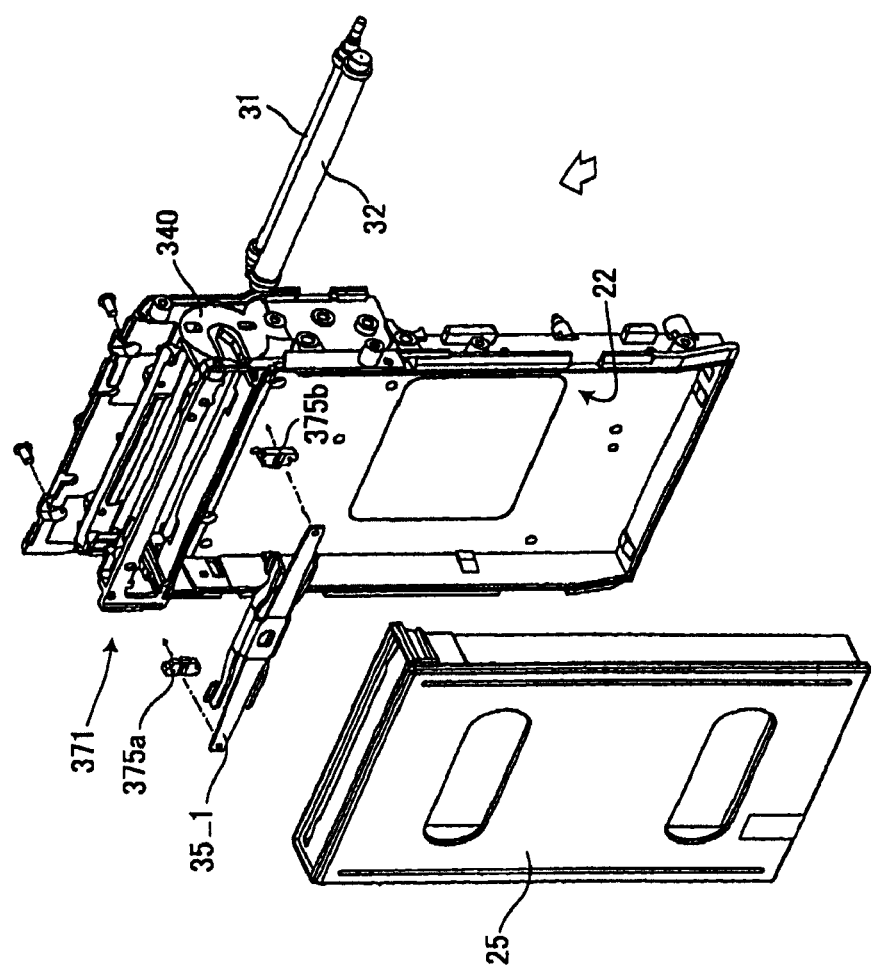
FIG. 10 is an exploded perspective view showing the carrying roller holding section in a different direction.
Figure 11:
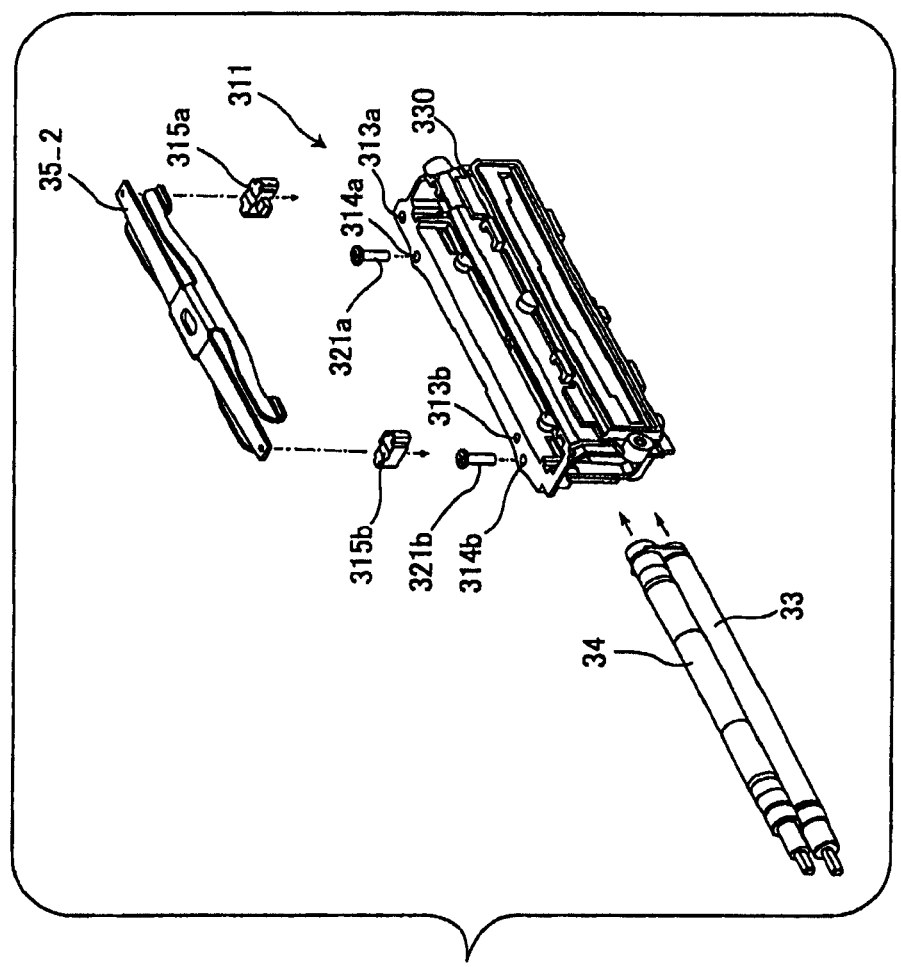
FIG. 11 is an exploded perspective view of the developing roller holding section.

FIG. 9 is an exploded perspective view showing the carrying roller holding section and the developing roller holding section, which are further disassembled, FIG. 10 is an exploded perspective view showing the carrying roller holding section in a different direction, and FIG. 11 is an exploded perspective view of the developing roller holding section.

As shown in FIG. 9 and FIG. 10, a resin component 340 constituting the carrying roller holding section 371 forms both the carrying roller holding section 371 and the pack chamber 22, and as shown in FIG. 9 and FIG. 11, a resin component 330 constituting the developing roller holding section 311 is constituted as the resin component 330 separate from the resin component 340 constituting the carrying roller holding section 371 and the pack chamber 22.

Here, as shown in FIG. 9 and FIG. 10, a pair of carrying rollers 31, 32 are incorporated in the carrying roller holding section 371, and the carrying roller 32, one of the pair of carrying rollers 31, 32 is urged by the spring member 35_1 towards the other carrying roller 31 via the bearing members 375a, 375b. The pair of carrying rollers 31, 32 have the role of clamping both side portions of the instant film sheet taken out from the inside of the instant film pack 25 and of carrying the instant film sheet.

As shown in FIG. 9 and FIG. 11, a pair of developing rollers 33, 34 are incorporated in the developing roller holding section 311, and the developing roller 34 one of the pair of developing rollers 33, 34 is urged by the spring member 35_2 towards the other developing roller 33 via bearing members 315a, 315b. The pair of developing rollers 33, 34 have the role of crushing a developer pool 1001a (refer to FIG. 16) provided for the front end portion in the carrying direction of the instant film sheet, and of spreading the developer over the instant film sheet.

After each unit of the carrying roller holding section 371 and the developing roller holding section 311 is assembled, the developing roller holding section 311 is fixed to the carrying roller holding section 371 with four screws 321a, 321b, 322a, 322b, as described with reference to FIG. 8.

Figure 12:
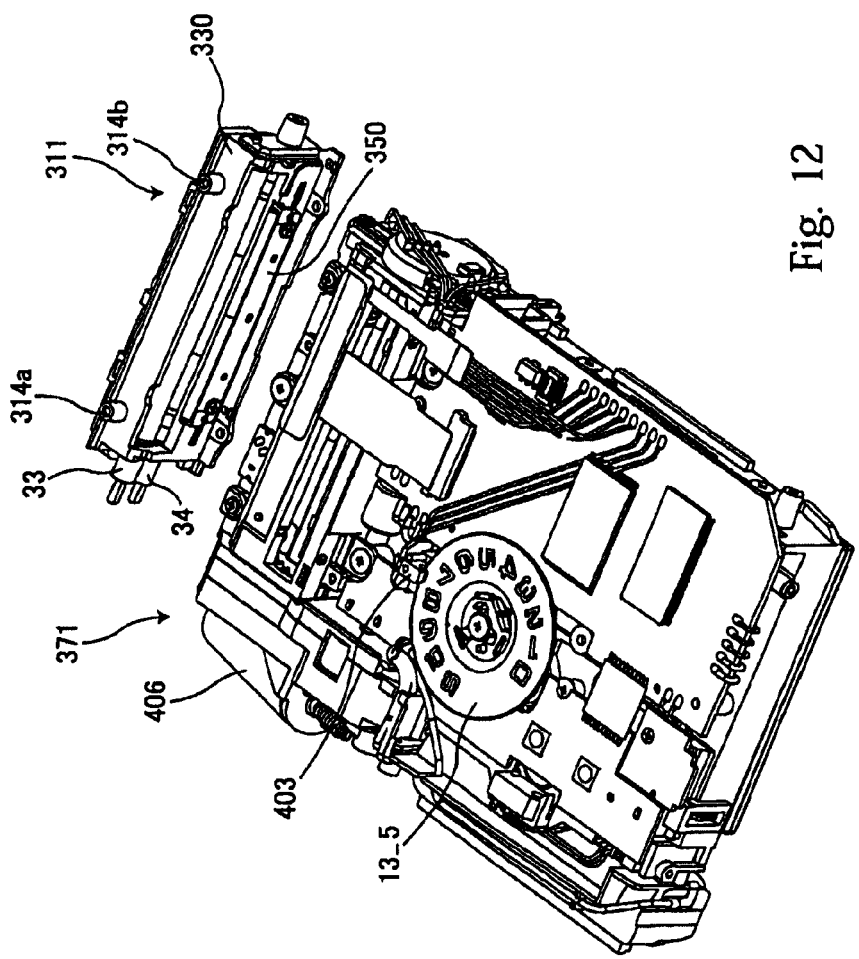
FIG. 12 is an exploded perspective view showing the disassembled situation shown in FIG. 8 from a face opposite to the face shown in FIG. 8.
Figure 13:
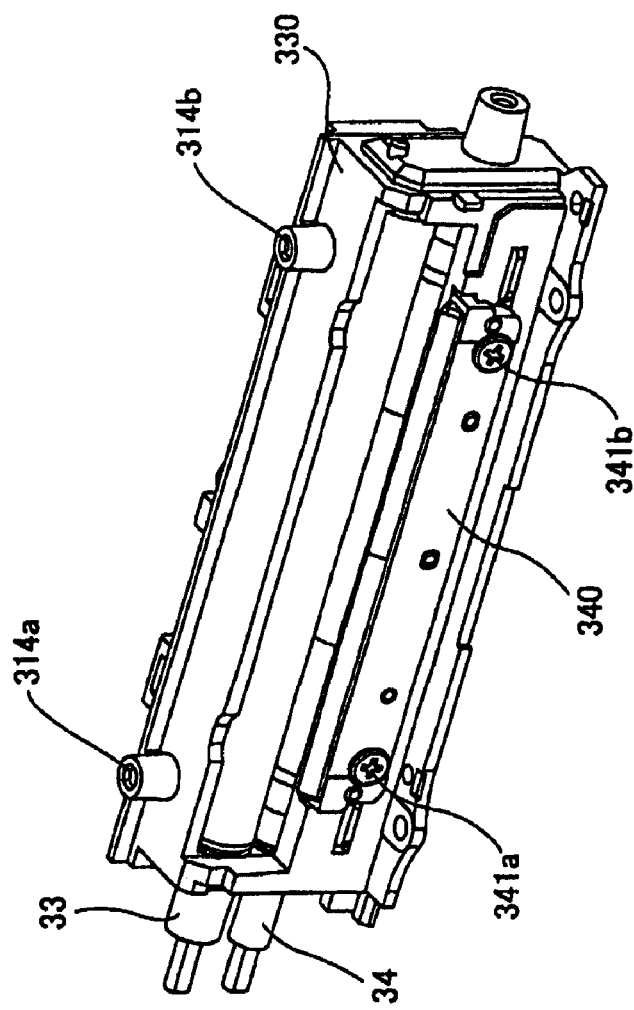
FIG. 13 is an enlarged view of the developing roller holding section.
Figure 14:
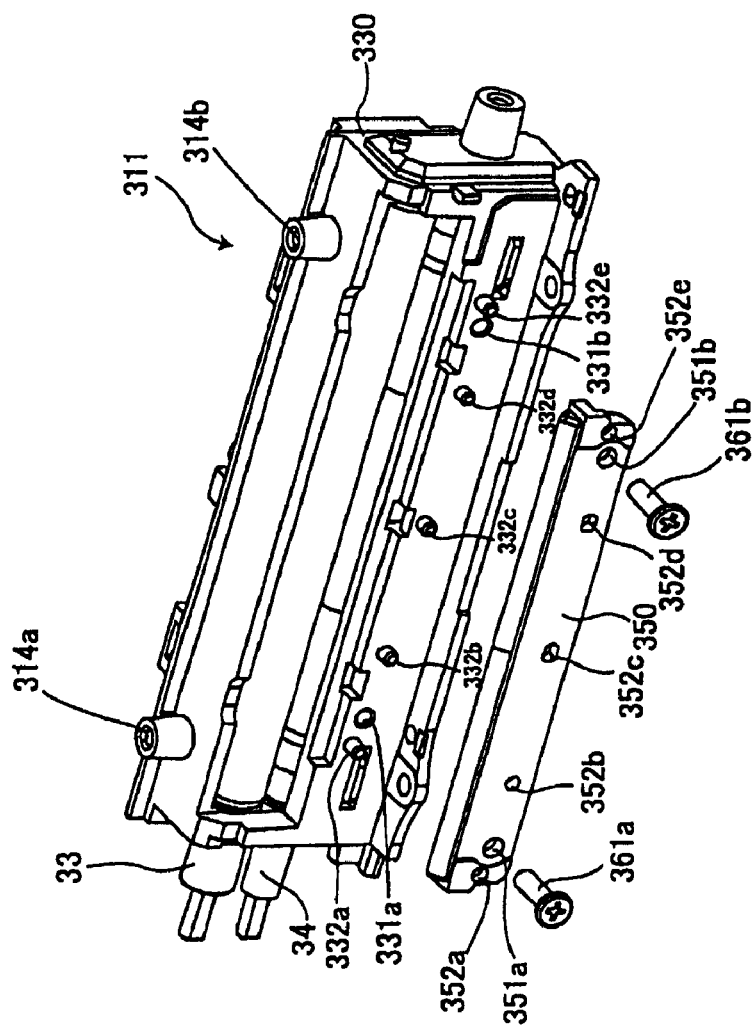
FIG. 14 is a perspective view in which the developing roller holding section shown in FIG. 13 is further disassembled.

FIG. 12 is an exploded perspective view showing the disassembled situation shown in FIG. 8 from a face opposite to the face shown in FIG. 8, FIG. 13 is an enlarged view of the developing roller holding section seen from the same viewpoint as FIG. 12, and FIG. 14 is a perspective view in which the developing roller holding section shown in FIG. 13 is further disassembled.

As shown in FIG. 12, a number plate 13_5 constituting a mechanical counter, and a COUNTPI section 403 as a photointerrupter for detecting whether the number plate 13_5 is at the initial position or not, are provided for the rear face side of the pack chamber 22 (refer to FIG. 9 etc.). However, as their details will be described below, here, the developing roller holding section 311 is further described.

A control plate 350 is attached to the developing roller holding section 311. As shown in FIG. 14, two mounting holes 351a, 351b and five positioning holes 352a, 352b, 352c, 352d, 352e are provided for the control plate 350. On the other hand, two screw holes 331a, 331b are provided for the resin member 330 constituting the developing roller holding section 311 at positions corresponding to the two mounting holes 351a, 351b of the control plate 350, and five positioning bosses 332a, 332b, 332c, 332d, 332e are provided at positions corresponding to the five positioning holes 352a, 352b, 352c, 352d, 352e of the control plate 350. In order to fix the control plate 350 to the resin member 330, the control plate 350 is arranged in a state where the five positioning bosses 332a, 332b, 332c, 332d, 332e of the resin member 330 are fitted into the five positioning holes 352a, 352b, 352c, 352d, 352e of the control plate 350, respectively, and two screws 361a, 361b are inserted into the two mounting holes 351a, 351b, and are fixed into the two screw holes 331a and 331b. Thus, the control plate 350 is positioned with high precision, and fixed to the resin component 330. The control plate 350 is positioned between the carrying rollers and the developing rollers after assembly, and have the role of controlling to spread the developer over the instant film sheet by directly touching and stroking the instant film sheet being carried so as to make the developer uniformly spread over the instant film sheet. The control plate 350, which directly touches and rubs the instant film sheet, is made of a low friction plastic material so as to prevent the instant film sheet from being damaged. The control plate 350 needs such characteristics and hence is constituted separately from the resin component 330 so as to be attached to the resin component 330.

The present embodiment, in which the resin component 330 constituting the developing roller holding section 311 is constituted separately from the resin component 340 constituting the carrying roller holding section 371, enables the control plate 350 to be positioned with high precision between the carrying rollers and the developing rollers.

Figure 15:
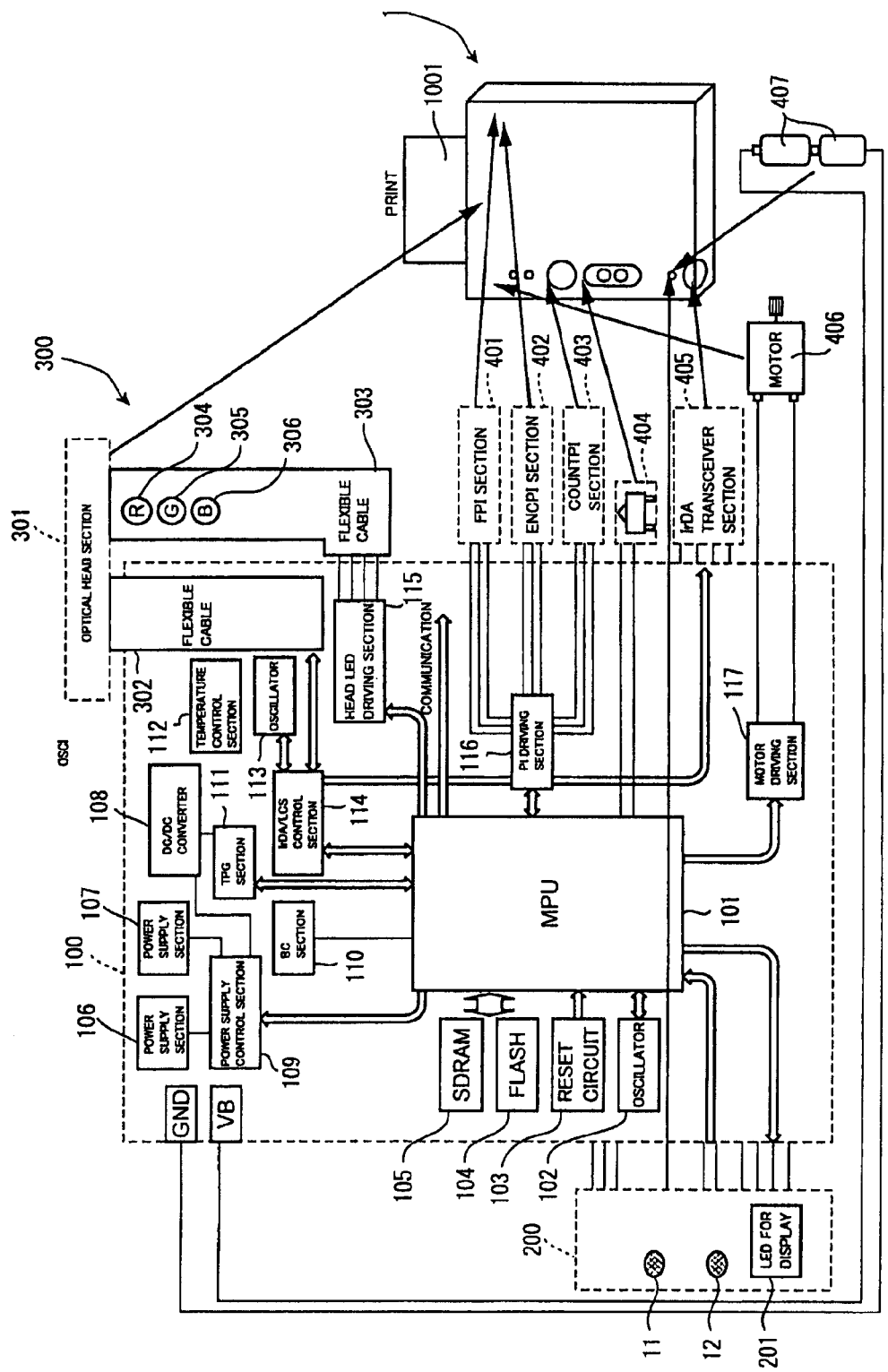
FIG. 15 is a block diagram showing a control system in the printer.

FIG. 15 is a block diagram showing a control system in the printer.

The printer 1 shown in FIG. 1 is schematically illustrated in the right end portion of FIG. 15, and a configuration representing the control system of the printer 1 is shown in the entire area except for the right end portion. The arrows shown in FIG. 15 represent the arrangement relation of each component constituting the control system of the printer 1.

The printer 1 is provided with a main substrate section 100, a sub substrate section 200, an image writing section 300, a FPI section 401, an ENCPI section 402, a COUNTPI section 403, a cam operated switch 404, an IrDA transceiver section 405 provided for the above-described transceiver section 14, and the above-described d.c. motor 406.

The sub substrate section 200 is provided with the power supply SW11, the repeat SW12 and the LED section 201 for display, each described above. The LED section 201 for display is provided with the LED 15 for power supply, the LED 16 for communication error, the LED 17 for low battery display, each described above, and a counter backlight LED (not shown) provided at the rear side of the counter 13.

The image writing section 300 is provided with an optical head section 301 having a light-guide and a liquid crystal shutter (LCS), etc., flexible cables 302, 303 connecting the optical head section 301 with the main substrate section 100, and light emitting elements (LED) 304, 305, 306, respectively having the luminescent color of red (R), green (G), blue (B), which elements are mounted to the flexible cable 303. The image writing section 300 writes a latent image on the instant film sheet being carried, by irradiating in turn three color light beams of R, G, B from the LEDs 304, 305, 306, based on the image data which is received by the transceiver section 14 in synchronism with the write instruction pulse. The two 3 V primary batteries 407 are also incorporated in the printer 1.

The main substrate section 100 will be described in more detail hereinbelow. The power supply voltage VB of 6 V from the primary batteries 407 connected in series is applied to the main substrate section 100. The main substrate section 100 is provided with a MPU (Micro Processor Unit) 101, an oscillator 102, a reset circuit 103, flash memory (FLASH) 104, and a SDRAM 105.

The MPU 101 totally controls the operation of the printer 1.

The oscillator 102 generates an oscillation signal of a predetermined frequency, and supplies the signal to the MPU 101 as a clock signal for operation.

The reset circuit 103 outputs the reset signal for initializing the MPU 101.

The Flash memory 104 is a nonvolatile memory, in which adjustment values, etc. for adjusting individual differences determined depending on the mechanism, etc. intrinsic to the printer 1 are stored.

The SDRAM 105 is a volatile memory, in which image data, etc. from the portable phone with camera 2 are stored.

The main substrate section 100 is also provided with a power supply section 106 outputting a voltage of 2.5 V, a power supply section 107 outputting a voltage of 3.3 V, and a DC-DC converter 108 outputting a voltage of 15 V, the 6 V power supply voltage VB being inputted to the power supply sections 106, 107 and DC-DC converter 108. Further, the main substrate section 100 is provided with a power supply control section 109 which controls the power supply sections 106, 107, and the DC-DC converter 108 in accordance with the instruction from the MPU 101. Here, the voltage of 2.5 V is supplied to the MPU 101, and the voltage of 3.3V is supplied to peripheral circuits other than the MPU 101. The voltage of 15V is used for driving the LCD, as will be described below.

The printer 1 is provided with the MPU 101 having a standby mode as a low power consumption mode, for the purpose of extending the lifetime of the primary batteries 407, and enters the standby mode at the time of completion of the initial processing, even in the case where the power supply SW 12 is depressed. When the infrared communication is performed from the outside in this situation, the printer 1 is shifted from the standby mode to the normal operation mode to record an image on the instant film sheet and then promptly shifted from the normal operation mode to the standby mode. When the repeat SW 12 is depressed, the printer 1 also enters the standby mode, after recording an image on the instant film sheet. In addition, the MPU 101 controls the power supply sections 106, 107 and the DC-DC converter 108 via the power supply control section 109 so as to supply electric power to each section only when the required operation is performed. Thus, the primary batteries 407 built in the printer 1 can be used for a longer period of time.

Further, the main substrate section 100 is provide with a BC section 110, a TPG section 111, a temperature detecting section 112, an oscillator 113, an IrDA/LCS control section 114 and a head LED driving section 115.

The BC section 110 checks whether the power supply voltage VB of the primary batteries 407 drops below a predetermined value or not. The MPU 101, when determining, with reference to the check result, that the power supply voltage VB of the primary batteries 407 has dropped below the predetermined value, turns on the LED 17 for low battery display, in order to prompt the user for exchange of the battery.

The TPG section 111 turns on and off the voltage of 15V outputted from the DC-DC converter 108.

The temperature detecting section 112 detects the temperature of the image writing section 300. The MPU 101 controls the shutter speed, etc. of each shutter section of the liquid crystal shutter in the optical head section 301 in accordance with a detection signal from the temperature detecting section 112.

The oscillator 113 generates an oscillation signal of a predetermined frequency, and supplies the oscillation signal to the IrDA/LCS control section 114.

The IrDA/LCS control section 114 controls the IrDA transceiver section 405 and the optical head section 301 based on the oscillation signal from the oscillator 113. The IrDA transceiver section 405 is provided with a light emitting element and a light receiving element for performing the infrared communication, and the IrDA/LCS control section 114 sends to the MPU 101 the data subjected to the photoelectric conversion by the above-described light receiving element, or transmits data for informing external devices of the sending of the data from the MPU 101 to the outside via the above-described light emitting element. The IrDA/LCS control section 114 also controls, based on the instruction from the MPU 101, the liquid crystal shutter provided for the optical head section 301 via the flexible cable 302.

The head LED driving section 115 drives the LEDs 304, 305, 306 by feeding currents based on the instruction from the MPU 101, to the LEDs 304, 305, 306 via the flexible cable 303.

The printer 1 according to the present embodiment, while carrying the instant film sheet in the predetermined subscanning direction (instant film sheet carrying direction) by means of the d.c. motor 406, writes on the instant film sheet a color of three colors of R, G, B in turn in the subscanning direction, and simultaneously writes the same color in all pixels arranged in the main scanning direction orthogonal to the subscanning direction, thereby recording a color image on the instant film sheet.

In recording a color image, a control signal corresponding to image data is supplied to the optical head section 301 constituting the image writing section 300 from the IrDA/LCS control section 114 via the flexible cable 302. The control signal is to control the shutter speed of each shutter section of the liquid crystal shutter in the optical head section 301. The shutter speed of each shutter section is controlled in accordance with image data, so that light beams respectively corresponding to RGB from the LEDs 304, 305, 306 provided for the flexible cable 303 are irradiated on the instant film sheet, so as to make a latent image having many light spots (dots) recorded in the width direction of the instant film sheet. The width direction, i.e., the direction in which each shutter section is one dimensionally arranged is the main scanning direction. Thus, each of the shutter sections is electronically scanned in the main scanning direction, so that light spots for one line (all pixels) are recorded on the instant film sheet. The light spots having many dots are recorded in the main scanning direction of the instant film sheet by the electronic scanning of the optical head section 301. As described above, the instant film sheet is carried in the subscanning direction by the d.c. motor 406 in the present embodiment. Thus, also in the subscanning direction, the light spots are successively recorded for each of the many dots by the image writing section 300.

The main substrate section 100 is also provided with a PI driving section 116. The PI driving section 116 drives the FPI section 401, the ENCPI section 402, and the COUNTPI section 403. Here, the FPI section 401, the ENCPI section 402 and the COUNTPI section 403 are described.

The FPI section 401 is a photointerrupter for detecting the presence of the instant film sheet.

The ENCPI section 402 is a photointerrupter for outputting an encode signal having a pulse train synchronized with the rotation of the d.c. motor 406.

The COUNTPI section 403 is a photointerrupter for detecting the initial position of the counter 13.

The cam operated switch 404 is also connected to the main substrate section 100. The cam operated switch 404 is a switch for monitoring the initial position of the carrying mechanism of the printer 1.

Further, the main substrate section 100 is provided with a motor driving section 117. The motor driving section 117 controls the rotational speed of the d.c. motor 406 so as to make the time interval of the pulse train of the encode signal outputted from the ENCPI section 402 a predetermined time interval, in response to the instruction from the MPU 101.

Figure 16:
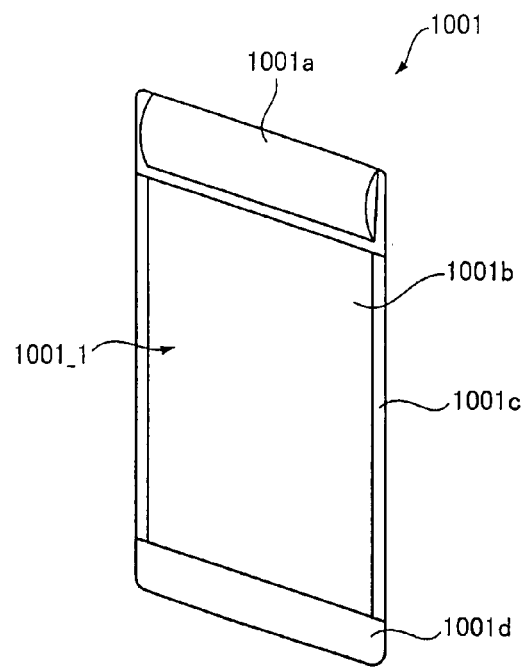
FIG. 16 is a perspective view showing an exposure surface of an instant film sheet.
Figure 17:
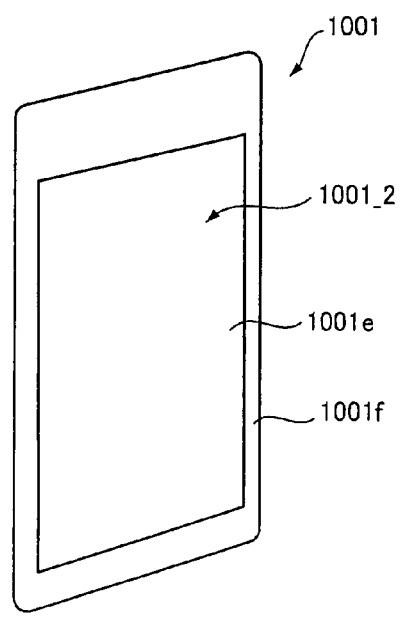
FIG. 17 is a perspective view showing an observation surface of the instant film sheet.

FIG. 16 is a perspective view showing the exposure surface of the instant film sheet, and FIG. 17 is a perspective view showing the observation surface of the instant film sheet.

An exposure surface 1001_1 of the instant film sheet 1001 is shown in FIG. 16. In the exposure surface 1001_1, there are provided with the developer pool 1001a arranged in the tip portion in the carrying direction of the instant film sheet 1001, an exposure section 1001b in which an image is exposed, a margin section 1001c, and a trap section 1001d which absorbs the surplus of the developer. The instant film sheet 1001 at the side of an observation surface 1001_2 is shown in FIG. 17. In the observation surface 1001_2, there are provided an observation section 1001e for observing the image visualized by subjecting the latent image formed by exposure to the spreading of the developer, and a margin section 1001f.

Figure 18:
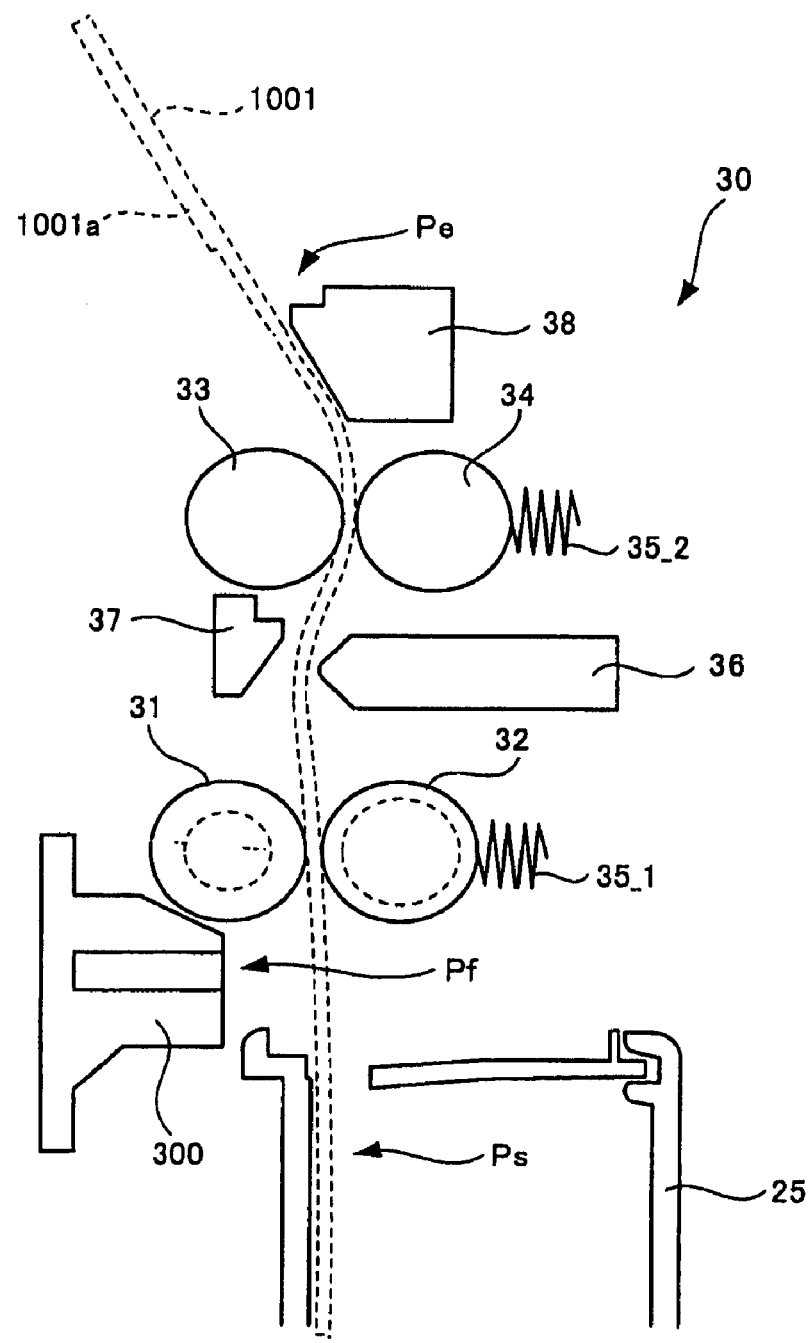
FIG. 18 is a sectional view of a medium carrying and developing section.

FIG. 18 is a sectional view of the medium carrying and developing section.

The medium carrying and developing section 30 is provided with a pair of carrying rollers 31, 32 which carry the instant film sheet 1001 by clamping both side portions of the instant film sheet 1001. The carrying roller 32 is urged by the spring member 35_1 toward the side of the carrying roller 31.

The medium carrying and developing section 30 is also provided with a pair of developing rollers 33, 34 which are arranged on the downstream side in the carrying direction of the instant film sheet 1001 from the pair of carrying rollers 31, 32 described above, and which clamps the instant film sheet 1001 over the entire width thereof and crushes the developer pool 1001a so as to spread the developer. The developing roller 34 is urged by the spring member 35_2 toward the side of the developing roller 33.

Further, the medium carrying and developing section 30 is provided with the control plate 36 which is positioned between the carrying rollers 31, 32 and the developing rollers 33, 34, and which control the developer being spread, a film guide 37 which guides the instant film sheet 1001 to the developing rollers 33, 34, and a film guide frame 38 for guiding the instant film sheet 1001 to the outside. The image writing section 300 is provided in the vicinity of the outlet of the instant film pack 25.

The printer 1 according to the present embodiment rakes up the uppermost one, at the top face side of the printer 1, of the instant film sheets 1001 in the instant film pack 25, by the claw 24 (refer to FIG. 4, and FIG. 5) at a predetermined carriage start position Ps, and then starts to write an image at a fixed writing point Pf by the image writing section 300, while carrying the instant film sheet 1001 by the carrying rollers 31, 32. The printer 1 further carries the instant film sheet 1001 by the carrying rollers 31, 32, while writing the image on the instant film sheet 1001, crushes the developer pool 1001a by the developing rollers 33, 34 to spread the developer, performs the development by controlling the developer being spread by the control plate 36 and the film guide 37, and carries the instant film sheet 1001 to a predetermined carriage end point Pe. Thus, an image is recorded on a piece of the instant film sheet 1001.

Figure 19:
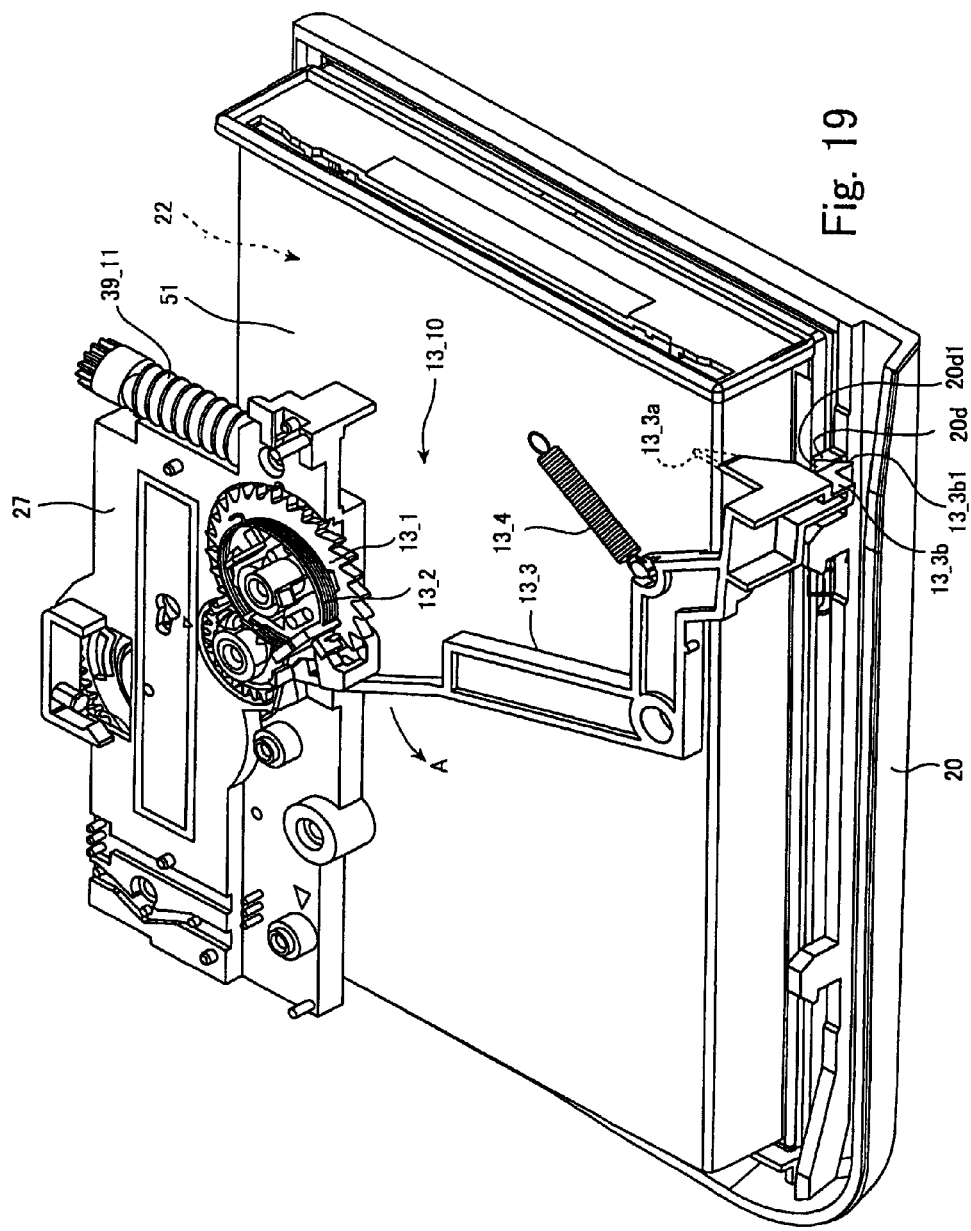
FIG. 19 is a perspective view of the printer according to the present embodiment seen form the surface side of the printer, in a situation where the casing is removed.
Figure 20:
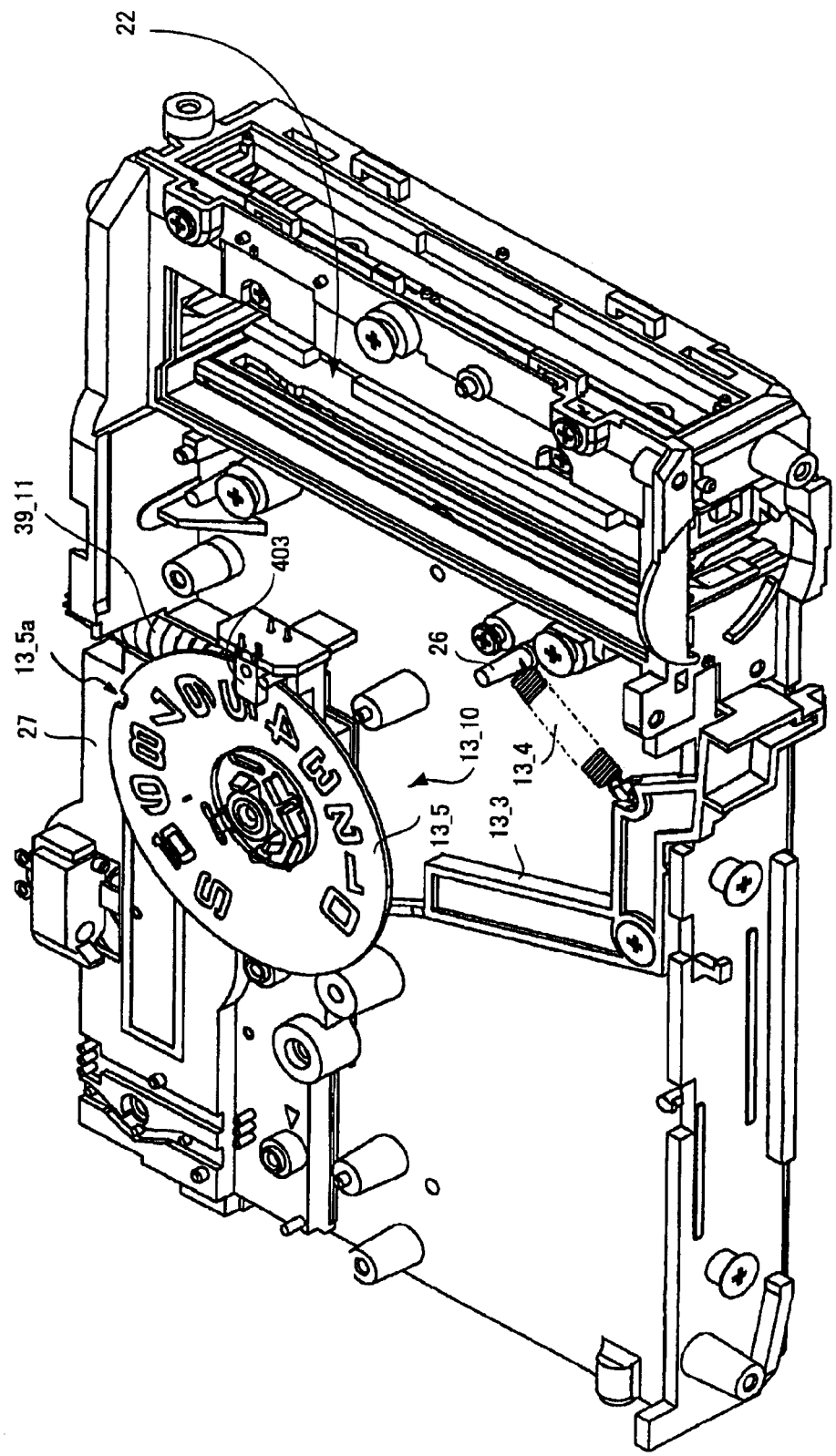
FIG. 20 is a perspective view showing a situation where a number plate is attached to the printer shown in FIG. 19.

FIG. 19 is a perspective view of the printer according to the present embodiment seen from the surface side, in a situation where the casing is removed, and FIG. 20 is a perspective view in a situation where the number plate is attached to the printer shown in FIG. 19.

As shown in FIG. 19, the printer 1 is provided with a box body 51 which has the resin component 340 (refer to FIG. 9) and in which the pack chamber 22 is included, the cover member 27 arranged on the top face of the box body 51, and a counter section 13_10 constituting the counter 13. In FIG. 19, the film door 20 is also shown which openably covers the pack chamber 22. A rib 20d having a slanting surface section 20d1 is vertically provided for the film door 20.

The counter section 13_10 constituting the counter 13 is provided with a gear 13_1 for driving via a worm gear 39_11 which transmits the rotational drive force of the d.c. motor 406 (refer to FIG. 5). The number plate 13_5 shown in FIG. 20 is mounted on the top of the gear 13_1. The number plate 13_5 is provided with transparent characters 'S' and '10' to '0'. Below the number plate 13_5, there is also arranged an LED (not shown), by which the number plate 13_5 is illuminated (backlighted) from the rear side so as to improve the visibility of display of the counter 13. The number plate 13_5 shown in FIG. 20 is in the position where the numeral '8' can be seen from the opening of the counter 13 shown in FIG. 1. This number plate 13_5 also has a recess 13_5a between the numeral '7' and numeral '8'.

An unused instant film pack is provided with a shading plate, and at the time of loading the unused instant film pack, the recess 13_5a is positioned in a monitoring place of the COUNTPI section 403, so that the transparent character 'S' indicating that the loaded instant film pack is unused is positioned in the place of the above-described opening. At this time, when the power supply is turned on, the recess 13_5a is detected by the COUNTPI section 403. This enables the shading plate to be opened by the above-described claw, so as to bring the instant film sheet into the state where the use of the instant film sheet can be started, and then the counter 13 to be actuated and the number plate 13_5 to be rotated counterclockwise, as a result of which the numeral '10' indicating that the number of remaining sheets is 10 is displayed in the form of backlight. Thereafter, each time an image is recorded on the instant film sheet, the number indicating the number of remaining sheets is decremented by one is displayed, and when image recording has been performed to the tenth instant film sheet, the numeral '0' indicating that the number of remaining sheet is 0 is displayed in the form of backlight.

The counter section 13_10 is provided with a spring member 13_2 urging the gear 13_1 clockwise, a counter lever 13_3 whose tip portion engages with the teeth of the gear 13_1, and a spring member 13_4 whose one end is held by the counter lever 13_3 and whose other end is held by a member 26 so as to urge the counter lever 13_3. The counter lever 13_3 is provided with the rib 13_3a pressed by the loading of the instant film pack, a rib 13_3b having a slanting face portion 13_3b1 which is guided by the slanting face portion 20d1 of the rib 20d vertically provided for the film door 20.

The counter 13 provided with the counter section 13_10 described above is a counter which performs a count operation interlocked with the carrying sequence of the instant film sheet in the instant film pack loaded in the pack chamber 22. The counter 13 is a ratchet type counter which can be realized by a simple configuration as will be described below, and the provision of such mechanical counter eliminates the need to provide a memory which is capable of storing the number of remaining sheets of the instant film sheet 1001, even in the case where the primary batteries 407 are extracted.

When both the opening of the film door 20 and the taking out of the instant film pack in the pack chamber 22 take place, the counter lever 13_3 pivots in the direction indicated by arrow A by the spring member 13_4, so that the tip portion of the counter lever 13_3 is separated from the teeth of the gear 13_1, thereby enabling the gear 13_1 to be reset to the initial condition by the spring member 13_2. Thus, the counter 13 is not reset even at the time of such operation that the film door 20 is accidentally opened and is closed after notice of the erroneous opening, thereby making it possible to eliminate the problem that the number of remaining film sheets capable of being exposed becomes different from the number of remaining film sheets displayed by the counter 13.

The printer 1 according to the present embodiment is set to a ready state in which the count operation interlocked with the subsequent carrying sequence can be performed, when either the closing of the film door 20 or the loading of the instant film pack into the pack chamber 22 takes place. For this reason, for example, when the film door 20 is closed in the state where the instant film pack is not loaded into the pack chamber 22, the printer 1 is set to the ready state in which the count operation interlocked with the subsequent carrying sequence can be performed. Specifically, the slanting face portion 20d1 of the rib 20d vertically provided for the film door 20 is guided by the slanting face portion 13_3b1 of the rib 13_3b provided for the counter lever 13_3, so as to allow the tip portion of the counter lever 13_3 to engage with the teeth of the gear 13_1. In this state, the confirmation of operation can be performed by performing a series of sequences using the infrared communication etc.

Figure 21:
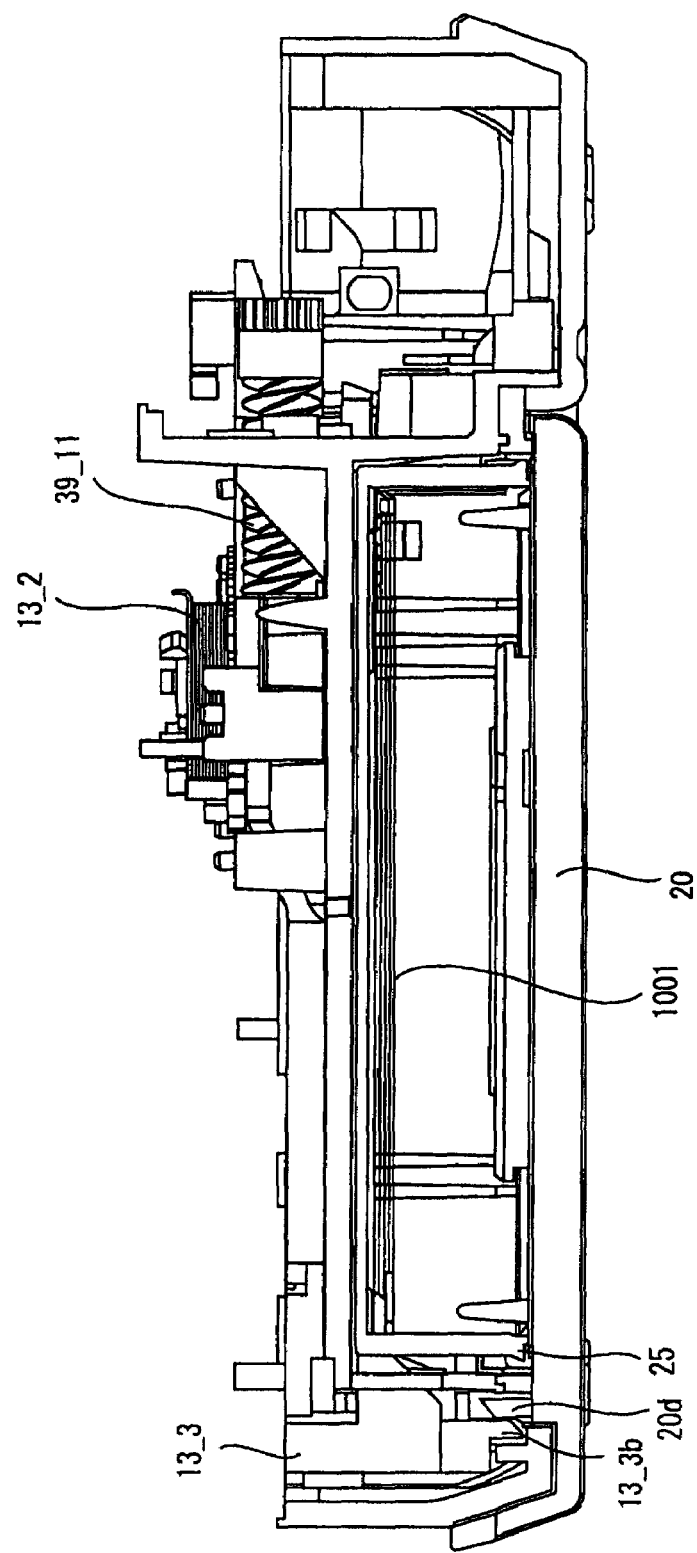
FIG. 21 is a sectional view showing a situation where the film door of the printer shown in FIG. 19 is closed.

FIG. 21 is a sectional view showing a situation where the instant film pack is loaded and the film door in the printer shown in FIG. 19 is closed.

In FIG. 21, there are shown the film door 20, the rib 20d provided for the film door 20, the counter lever 13_3 and the rib 13_3b provided for the counter lever 13_3. The instant film pack 25 in which plural pieces of the instant film sheets 1001 are stacked is also shown in FIG. 21. This figure shows a state in which the instant film pack 25 is loaded and the film door 20 is closed, and in which state since the rib 13_3b of the counter lever 13_3 is pressed by the rib 20d of the film door 20, as shown in FIG. 22 as will be described below, the tip portion of the counter lever 13_3 engages with the teeth of the gear 13_1.

Figure 22:
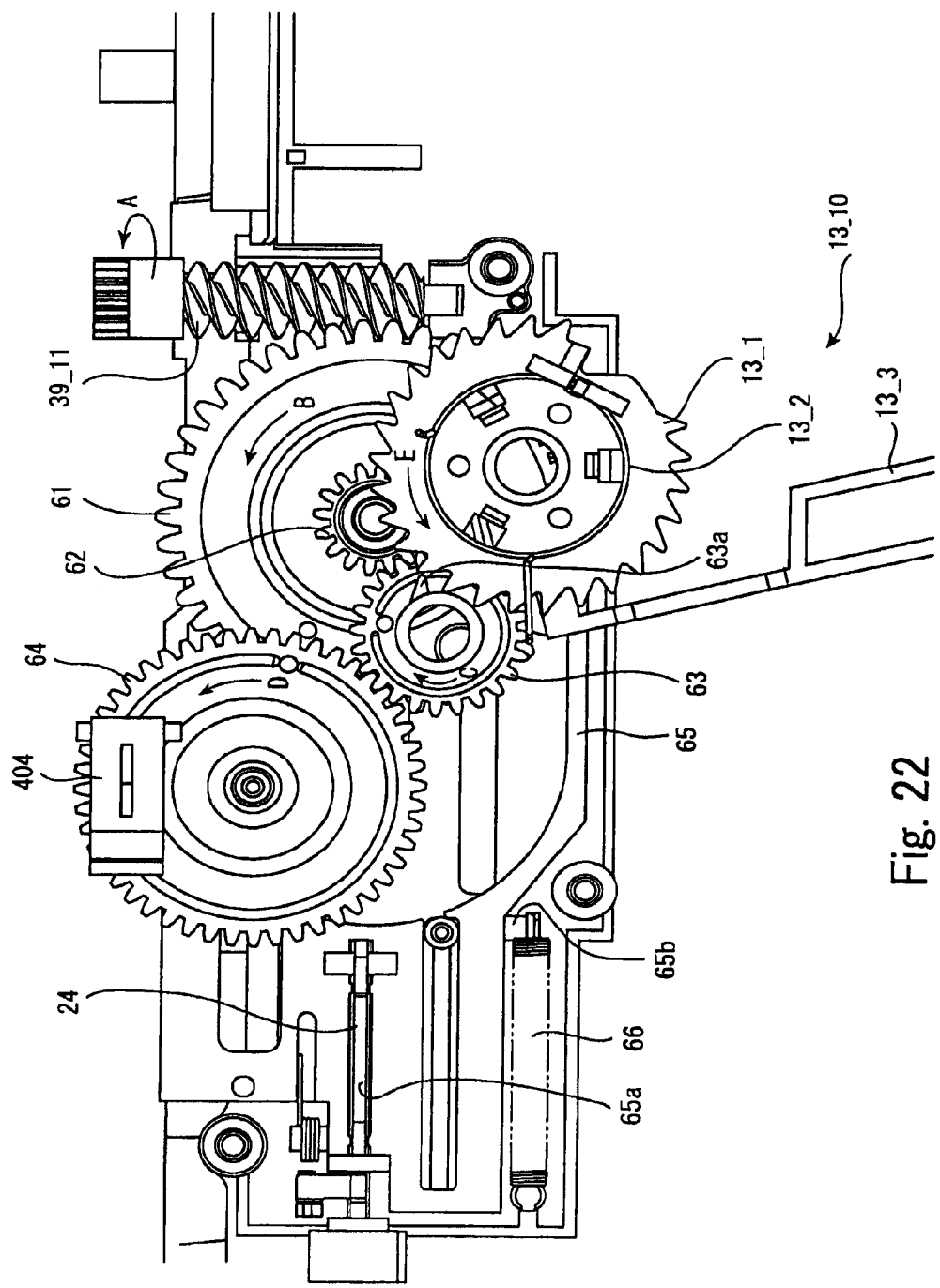
FIG. 22 is a top view showing a situation where a cover member of the printer shown in FIG. 19 is removed.

FIG. 22 is a top view showing a situation where a cover member of the printer shown in FIG. 19 is removed.

In FIG. 22, there are shown the counter section 13_10 described above, and the worm gear 39_11 which rotates in the direction indicated by arrow A, a three rotation cam 61 rotated in the direction indicated by arrow B under the rotational drive force from the worm gear 39_11, a gear 62 which is interlocked with the three rotation cam 61 and rotated, a gear 63 which engages with the gear 62 and is rotated in the direction indicated by arrow C, and an one rotation cam 64 rotated in the direction indicated by arrow D under the rotational drive force from the gear 63. Here, the one rotation cam 64 is a cam which completes a series of carrying sequences by rotating once, and which rotates once when the three rotation cam 61 rotates three times. The cam operated switch 404 to monitor the initial position of the series of sequences is mounted in the upper part of the one rotation cam 64.

Further, a claw plate 65 and a spring member 66 which urges the claw plate 65 are shown in FIG. 22. The claw plate 65 is provided with a straight advance guide groove 65a for guiding the claw 24 and a holding member 65b holding the spring member 66.

As shown in FIG. 21 described above, in a state where the instant film pack 25 is loaded and the film door 20 is closed, the tip portion of the counter lever 13_3 engages the teeth of the gear 13_1. Here, when the worm gear 39_11 rotates in the direction indicated by arrow A, the three rotation cam 61 rotates in the direction indicated by arrow B, so that claw plate 65 starts to rise in the direction of the worm gear 39_11. When the claw plate 65 starts to rise, the claw 24 is raised under the guidance of the straight advance guide groove 65a provided for the claw plate 65. Thereby, the instant film sheet 1001 starts to be raked up. The three rotation cam 61 rotates by interlocking with the gear 62, and the rotational drive force of the gear 62 is transmitted to the gear 63. Thereby, the gear 63 rotates in the direction indicated by arrow C. The gear 63 is provided with a craw 63a, which functions so as to press a tooth of the gear 13_1 of the counter 13 to the lower side. Then, the gear 13_1 rotates in the direction indicated by arrow E, so that the tip portion of the gear 13_3 engaging the teeth of the gear 13_1 goes over the teeth and engages the next upper teeth. In a series of sequences, such operations are repeated twice. That is, in the series of sequences, the gear 13_1 of the counter 13 rotates in the direction indicated by arrow E by two teeth. Thereby, the number plate 13_5 pivots in the direction to reduce the number only by one. Thus, each time an instant film sheet 1001 is discharged, the number of the counter 13 is reduced by one.

Here, the counter 13 is installed on a surface at the same side as the surface facing the exposure surface of the instant film sheet in the instant film pack 25 loaded in the pack chamber 22. The area of the surface of the printer 1, facing the exposure surface of the instant film sheet 1001 is large, so that a large counter 13 with area restrictions alleviated can be realized. Thus, the numerals indicating the number of remaining sheets of the instant film sheets 1001 become large, thereby enabling a display easy to see along with the irradiation of the number plate 13_5 with the above-described backlight.

Next, returning to the description of the medium carrying section 30 again, the detail structures of the carrying rollers and the developing rollers are described based on the description of the medium carrying section 30.

Figure 23:
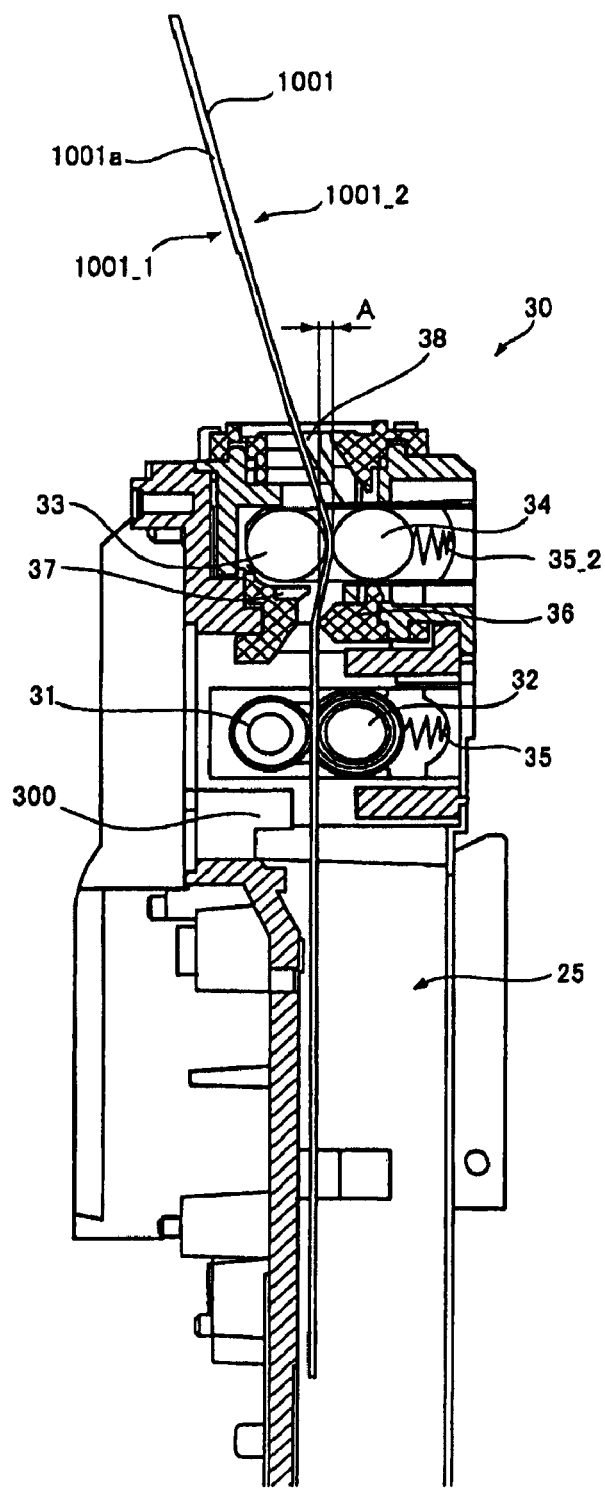
FIG. 23 is a sectional view showing a medium carrying section.
Figure 24:
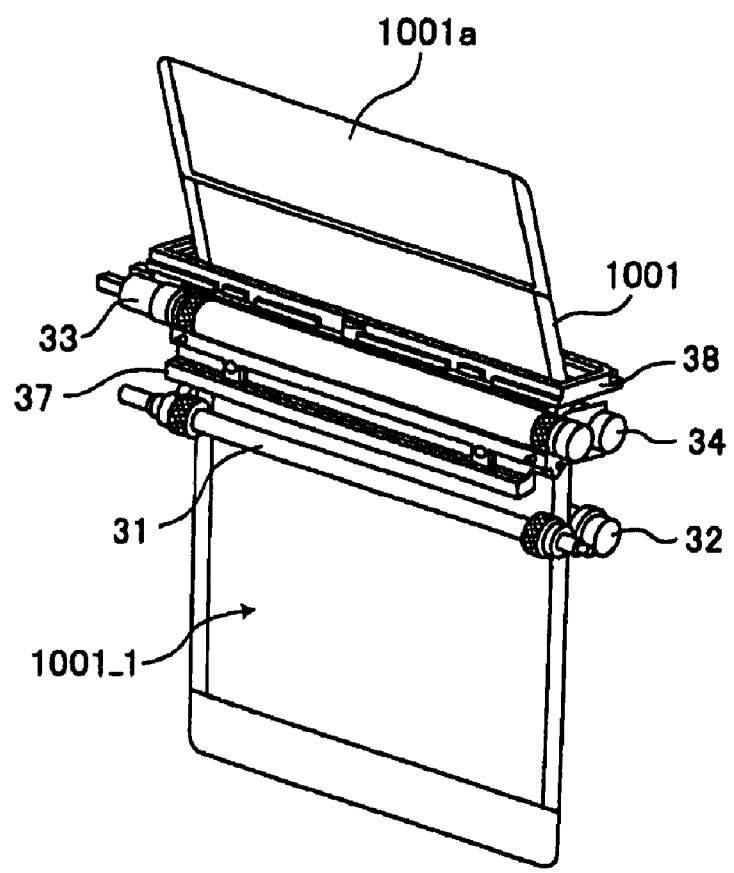
FIG. 24 is a perspective view showing the medium carrying section shown in FIG. 23, seen from the exposure surface side.

FIG. 23 is a sectional view showing the medium carrying section, and FIG. 24 is a perspective view showing the medium carrying section shown in FIG. 23 seen from the exposure surface side.

The medium carrying section 30 is provided with a pair of carrying rollers 31, 32 which carry the instant film sheet 1001 by clamping both side portions of the instant film sheet 1001 as shown in FIG. 24. The carrying roller 32 is urged by the spring member 35_1 shown in FIG. 23 toward the side of the carrying roller 31.

The medium carrying section 30 is also provided with a pair of developing rollers 33, 34 which are arranged on the downstream side in the carrying direction of the instant film sheet 1001 from the above-described pair of carrying rollers 31, 32, and which clamp the instant film sheet 1001 over its entire width and crush the developer pool 1001*a* so as to make the developer spread. The developing roller 34 is urged by the spring member 35_2 toward the side of the developing roller 33. More specifically, the pair of developing rollers 33, 34 are arranged at a position where the clamping position of the instant film sheet 1001 by the pair of developing rollers 33, 34 are offset by a dimension of A toward the side of the observation surface 1001_2 from the clamping position of the instant film sheet 1001 by the pair of carrying rollers 31, 32. This enables the instant film sheet 1001 to be bent by the offset dimension of A, as in the right side in FIG. 23, so that the control to spread the developer to a prescribed thickness can be readily performed in discharging the developer while spreading the developer on the instant film sheet 1001 from the developer pool 1001*a*.

Further, the medium carrying section 30 is provided with the control plate 36 which is positioned between the carrying rollers 31, 32 and the developing rollers 33, 34, which lies on the observation surface 1001_2 of the instant film sheet 1001 being carried, and which controls the expansion pattern of the developer being spread by rubbing the observation surface 1001_2 of the instant film sheet 1001 being carried. This control plate 36 is arranged in the position which divides the interspace between the pair of carrying rollers 31, 32, and the pair of developing rollers 33, 34 approximately into two parts. This control plate 36 enables the developer on the instant film sheet 1001, between the pair of carrying rollers 31, 32 and the pair of developing rollers 33, 34, to be evenly controlled for each of the carrying rollers 31, 32 and the developing rollers 33, 34. In addition, a portion of the control plate 36 orthogonal to the carrying direction of the instant film sheet 1001, has a cross sectional shape formed in a gentle circular shape. This enables the contact with the instant film sheet 1001 to be prevented from concentrating only on the central portion of the instant film sheet 1001, and thereby the developer to be controlled to spread uniformly.

The medium carrying section 30 is also provided with the film guide 37 which is positioned between the control plate 36 and the developing rollers 33, 34, and which guides the instant film sheet 1001 being carried to the developing rollers 33, 34.

Further, the medium carrying section 30 is provided with the film guide frame 38 which inclines the instant film sheet 1001 toward the side of the exposure surface 1001_1 with respect to the observation surface 1001_2, on the downstream side from the developing rollers 33, 34. This enables the instant film sheet 1001 to be bent in S-shape together with the contacting of the control plate 36 with the exposure surface 1001_1, and thereby the developer to be uniformly spread.

In FIG. 23, there are also shown the above-described image writing section 300 and the instant film pack 25 in which plural pieces of the instant film sheets 1001 are stacked. The uppermost one, at the top surface side of the printer 1, of the instant film sheets 1001 in the instant film pack 25 is raked up by the craw 24 (refer to FIG. 4) and has an image written thereon by the image writing section 300, while being carried by the above-described medium carrying section 30.

Next, the carrying roller 31 and the developing roller 33 are described. First, the carrying roller 31 is described.

Figure 25:
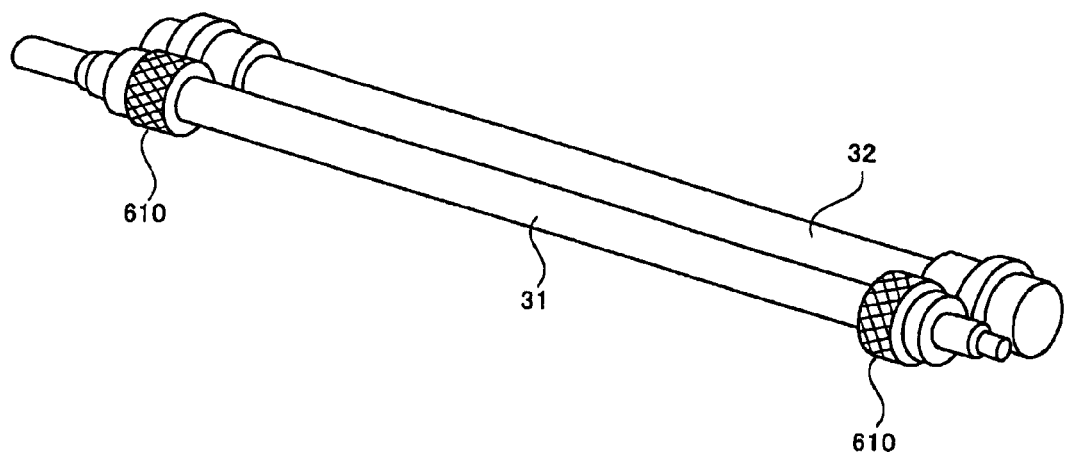
FIG. 25 is an enlarged figure showing the pair of carrying rollers shown in FIG. 24.

FIG. 25 is an enlarged figure showing the pair of carrying rollers shown in FIG. 24.

The carrying roller 31 of the pair of carrying rollers 31, 32 shown in FIG. 25 is a roller for rotational drive which is referred to as the so-called capstan roller, and the carrying roller 32 rotates in accordance with the rotation of the carrying roller 31. A protruding and recessed portions 610 are formed on the surface portions protruded in collar shape of the carrying roller 31, the portions corresponding to both side portions of the instant film sheet 1001. The protruding and recessed portion 610 is formed by the form rolling method as will be described below.

The form rolling method is a processing method in which a protruding and recessed portion is formed on the surface of a shaft by sandwiching, pressing and rotating the shaft to be subjected to the form rolling by means of plural rolling metal molds. In this method, since the surface of the shaft is plastically deformed in accordance with the shape of the rolling metal mold, plural protruding and recessed portions can be readily formed on the surface of the shaft itself, but a great force is applied for the shaft itself. Thus, when the protruding and recessed portions are to be formed on the surface of the shaft having a hollow cylindrical shape or having a portion protruded in collar shape, there is a problem that the shaft itself is deformed. Suppressing the amount of plastic deformation on the surface of the shaft to a small extent in order to avoid such problem, causes a problem that the protruding and recessed portions for carrying the recording medium are difficult to be accurately and surely formed. Hence, in the present embodiment, the protruding and recessed portions 610 are formed with rolling metal molds 510, 520, as will be described below, oh the surface portions of the carrying roller 31 which are protruded in collar shape, and which correspond to the both side portions of the instant film sheet 1001.

Figure 26:
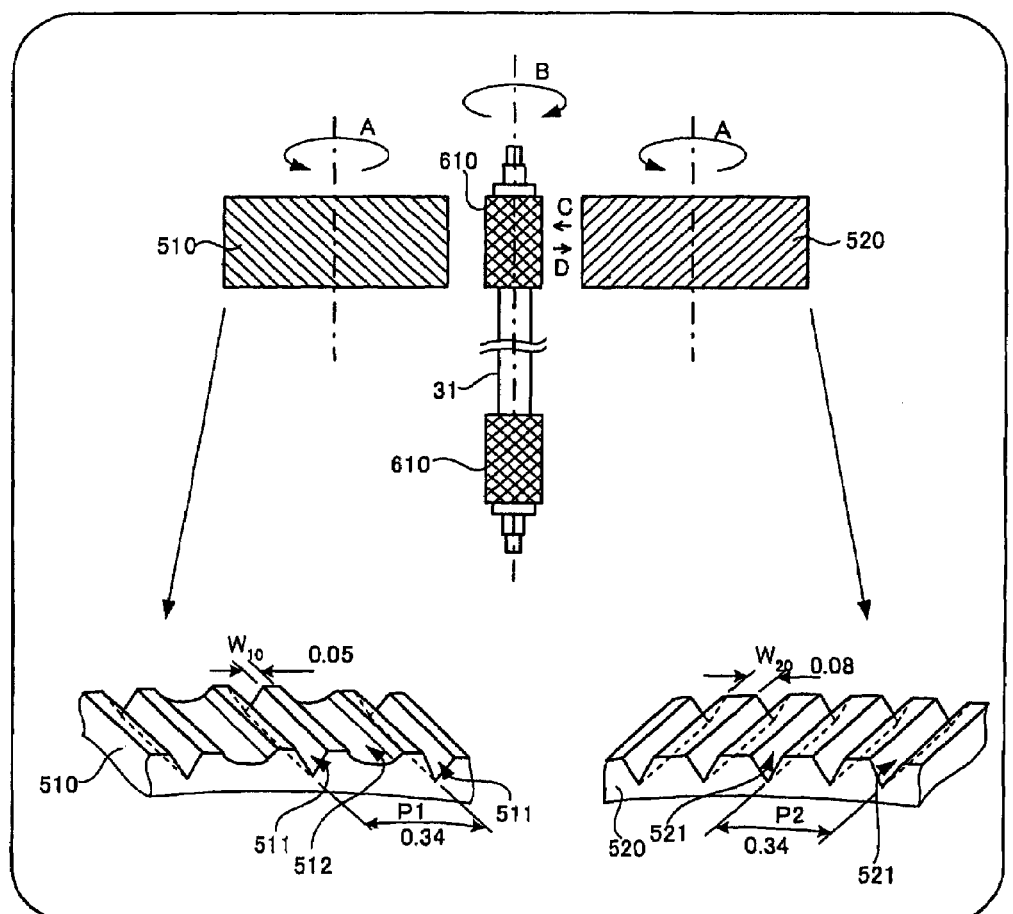
FIG. 26 is a figure showing a situation where a protruding and recessed portions 610 is formed by rolling metal molds 510, 520 on the surface portion protruded in collar shape of the carrying roller 31.
Figure 27:
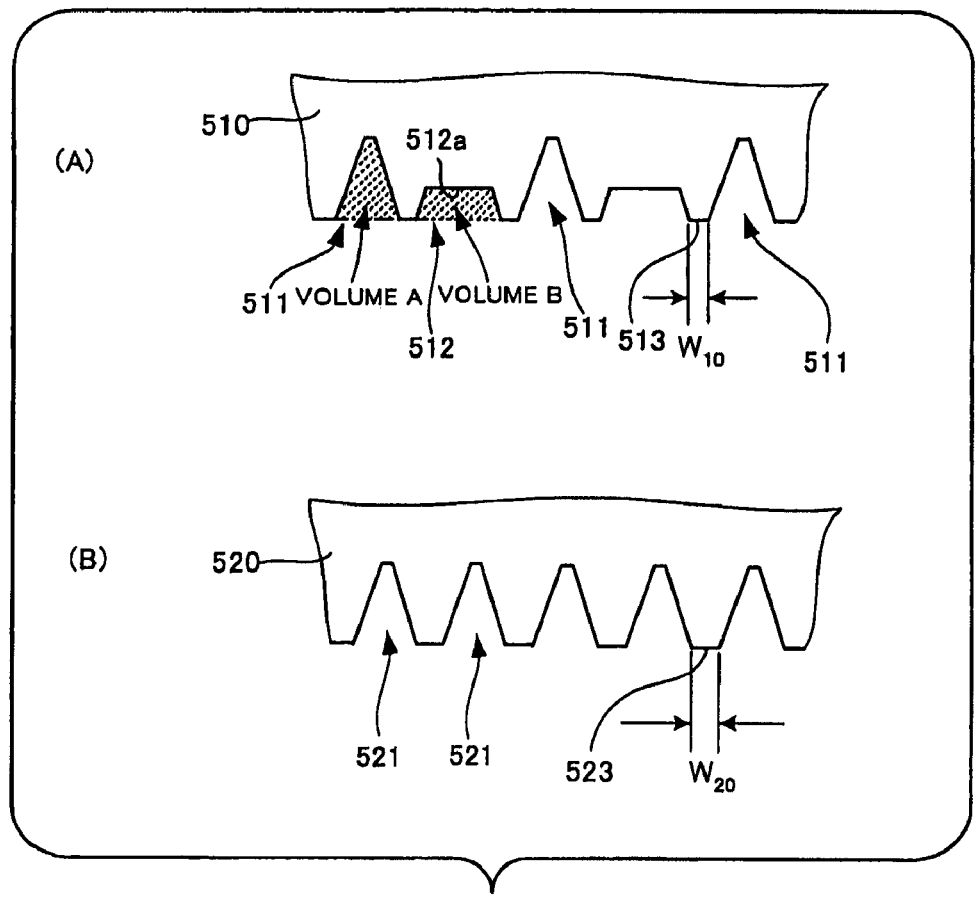
FIG. 27 is a figure showing a part of cross section of the rolling metal molds 510, 520.

FIG. 26 is a figure showing a situation where protruding and recessed portions 610 are formed by the rolling metal molds 510, 520 on the surface portions protruded in collar shape of the carrying roller 31, and FIG. 27 is a figure showing a part of cross section of the rolling metal molds 510, 520.

In FIG. 26, there are shown cylindrical rolling metal molds (roll dies) 510, 520 which rotate in the direction indicated by arrow A (counterclockwise rotation), and the carrying roller 31 which is arranged between the rolling metal molds 510, 520 and which rotates in the direction indicated by arrow B (clockwise rotation) which is reverse to the direction indicated by arrow A. The carrying roller 31 is a carrying roller to be subjected to the form rolling, and as will be described in detail below, is sandwiched and pressed between the rolling metal molds 510, 520 so as to be rotated, as a result of which the protruding and recessed portions 610 are formed on the surface portion protruded in collar shape of the carrying roller 31.

The rolling metal mold 510 has plural first grooves 511 having a predetermined depth, as shown in FIG. 27(A). These first grooves 511 are formed to a V-shape. The rolling metal mold 510 is provided with second grooves 512, formed between the respective first grooves 511, having a depth smaller than that of the first groove 511, and a cross sectional groove area larger than that of the first groove 511. The second groove 512 is a groove having a flat bottom portion 512a. Here, the dimension $W_{10}$ of a protruding portion 513 formed between the first groove 511 and the second groove 512 of the rolling metal mold 510 is 0.05 mm, as shown in FIG. 26. The pitch P1 which is a gap between the respective first grooves 511 of the rolling metal mold 510, is 0.34 mm. The relation between the volume A of the first groove 511 and the volume B of the second groove 512 is given by A B. This is based on the reason that when the second groove 512 as a clearance groove is filled by the inflow of the metal before the first groove 511 as a protrusion forming groove is filled by the inflow of the metal, the resistance of the metal filled in the second groove prevents the metal from being further intruded, thereby preventing a sharp protrusion from being formed.

On the other hand, the rolling metal mold 520 is, as shown in FIG. 26, a metal mold detachably attached to the carrying roller 31, and the rolling metal mold 520 has plural grooves 521 having a predetermined depth, as shown in FIG. 27 (B). The grooves 521 are formed to a V-shape. Here, the dimension $W_{20}$ of a protruding portion 523 formed between the respective grooves 521 of the rolling metal mold 520 is 0.08 mm which is larger than the dimension $W_{10}$ (0.05 mm) of the protruding portion 513 of the rolling metal mold 510. The pitch P2 which is a gap between the respective grooves 521 of the rolling metal mold 520 is 0.34 mm which is the same as the above-described pitch P1.

Forming the protruding and recessed portions 610 on the surface portion protruded in collar shape of the carrying roller 31 with such rolling metal molds 510, 520, includes moving the rolling metal mold 520 in the direction indicated by arrow D as shown in FIG. 26, arranging the carrying roller 31 between the rolling metal molds 510, 520, and rotating the rolling metal molds 510, 520 in the direction indicated by arrow A and the carrying roller 31 in the direction indicated by arrow B, and moving the rolling metal mold 520 in the direction indicated by arrow C so as to enable the protruding and recessed portions 610 to be formed on the surface portion protruded in collar shape of the carrying roller 31.

Figure 28:
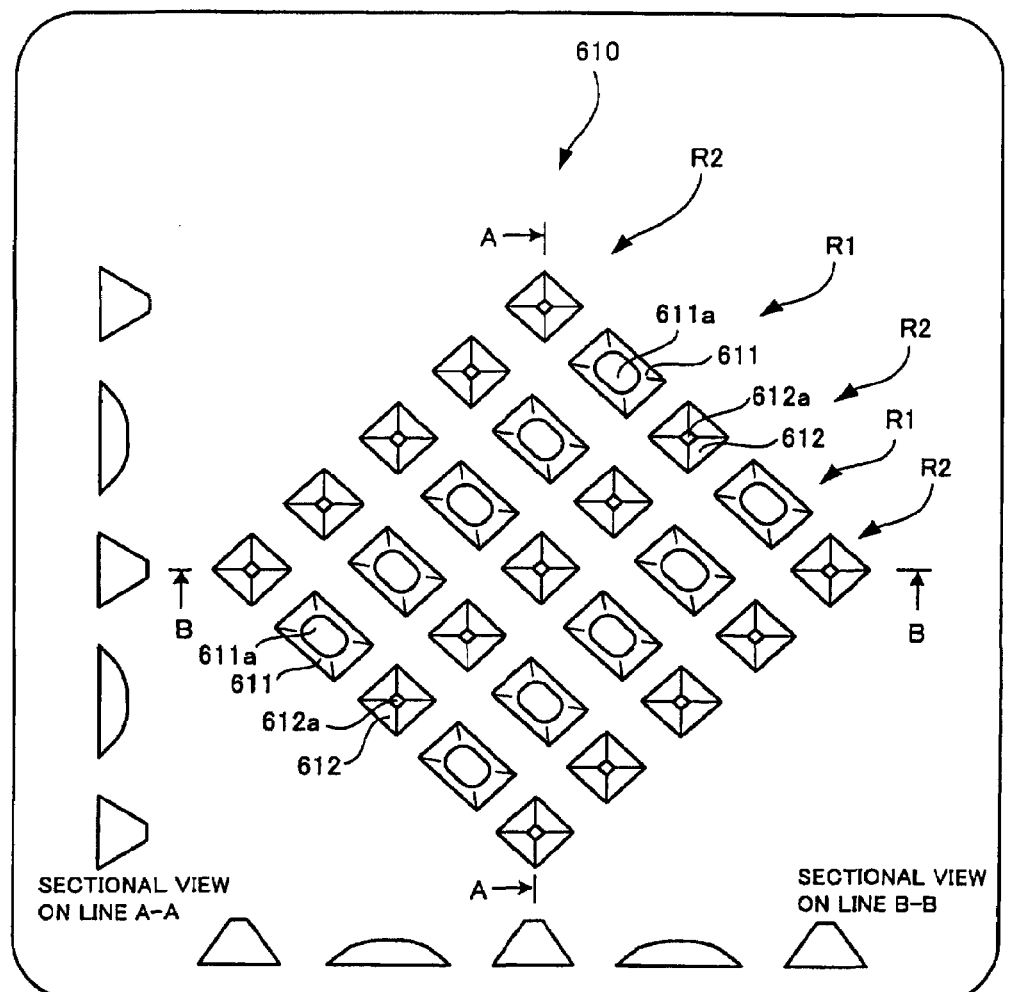
FIG. 28 is a figure showing the protruding and recessed pattern of the surface portion protruded in collar shape of the carrying roller, the pattern being formed with the rolling metal mold shown in FIG. 26.
Figure 29:
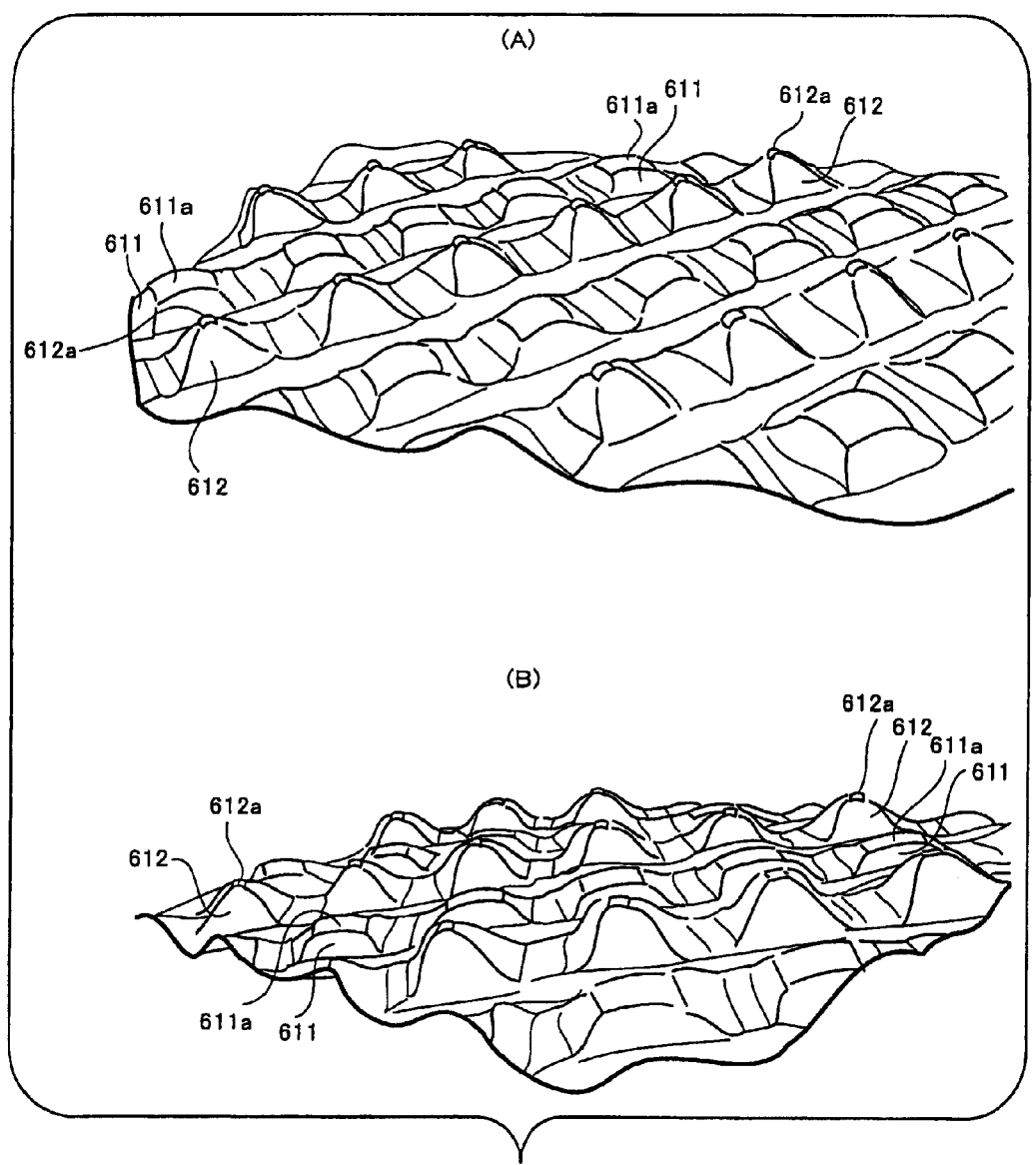
FIG. 29 is a partly enlarged perspective view showing the protruding and recessed portions of the surface portion protruded in collar shape of the carrying roller shown in FIG. 28.

FIG. 28 is a figure showing the protruding and recessed pattern of the surface portion protruded in collar shape of the carrying roller, formed with the rolling metal molds shown in FIG. 26, and FIG. 29 is a partly enlarged perspective view showing the protruding and recessed portions of the surface portion protruded in collar shape of the carrying roller shown in FIG. 28.

A pattern of the protruding and recessed portions 610 formed with the rolling metal molds 510, 520 is shown in FIG. 28. The pattern of the protruding and recessed portions 610 is formed by alternatively arranging a first pattern column R1 having quadriangular pyramids 611 (corresponding to an example of the second protruding portion according to the present invention) with a flat bottom portion 611a formed by the second groove 512 of the rolling metal mold 510 and the groove 521 of the rolling metal mold 520, and a second pattern column R2 having quadriangular pyramids 612 with a protrusion 612a (corresponding to an example of the first protruding portion according to the present invention) formed by the first groove 511 of the rolling metal mold 510 and the groove 521 of the rolling metal mold 520. As shown in sectional views on line A-A, line B-B shown in FIG. 28, and in perspective views shown in FIG. 29 (A), FIG. 29 (B), the protruding and recessed portions 610 are formed such that the protrusion 612a of the quadriangular pyramid 612 is higher and sharper than the bottom portion 611a of the quadriangular pyramid 611. Thereby, when the both side portions of the instant film sheet 1001 are stuck with the protrusion 612a, the instant film sheet 1001 can be surely stuck with the protrusion 612a, because the instant film sheet 1001 is received by the bottom portion 611a. Thus, the instant film sheet 1001 can be carried accurately and surely by the carrying roller 31. As shown in the sectional views on line A-A, line B-B shown in FIG. 28, the protrusions 612a are alternately formed, i.e. distributed, and thereby made easy to stick into the instant film sheet 1001 even with a low load.

Figure 30:
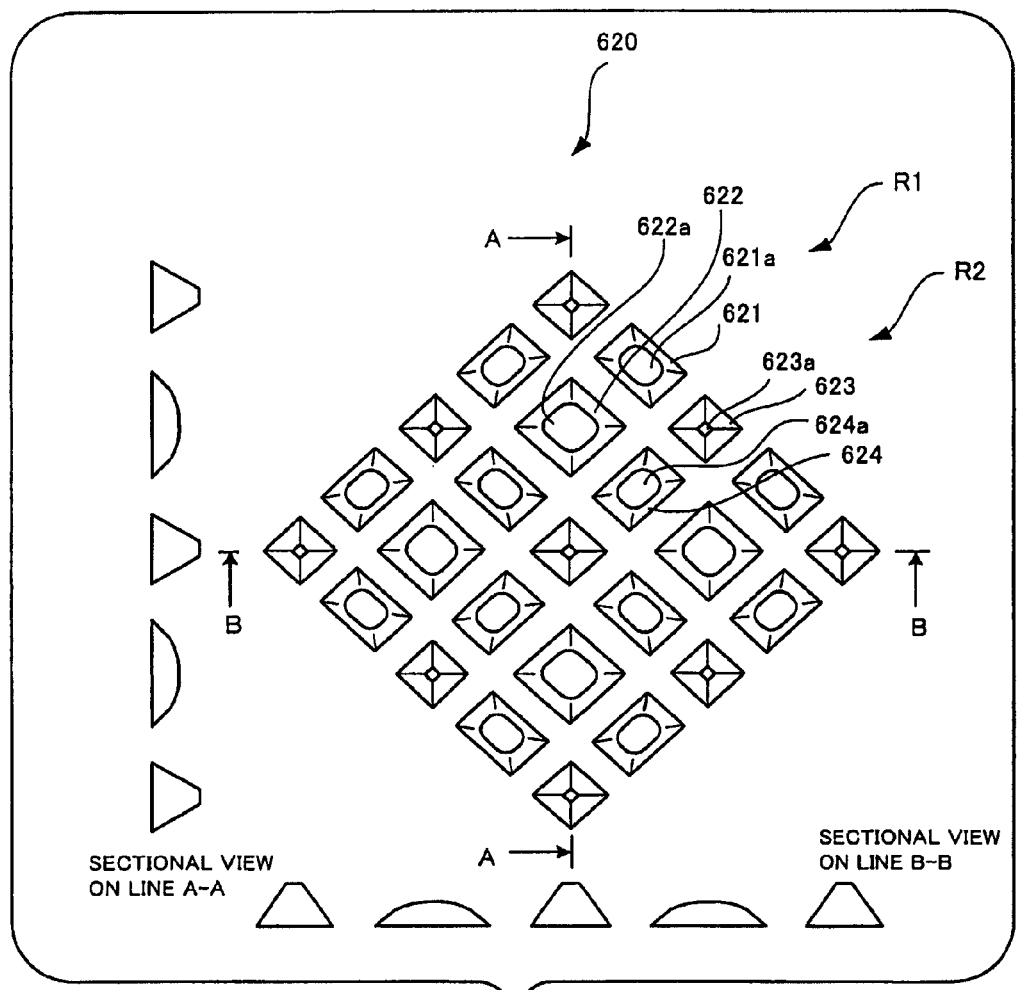
FIG. 30 is a figure showing a protruding and recessed pattern different from the protruding and recessed pattern shown in FIG. 28.

FIG. 30 is a figure showing a protruding and recessed pattern different from the protruding and recessed pattern shown in FIG. 28.

In FIG. 30, there is shown a protruding and recessed portions 620 formed by using two rolling metal molds 510 shown in FIG. 26. Here, the rolling metal mold 510 on the left-hand side shown in FIG. 26 is referred to as a first rolling metal mold. The rolling metal mold 510 in place of the rolling metal mold 520 shown on the right-hand side in FIG. 26 is referred to as a second rolling metal mold. The pattern of the protruding and recessed portions 620, has a first pattern column R1 having quadriangular pyramids 621 with a flat bottom portion 621a formed by the second groove 512 of the first rolling metal mold and by the first groove 511 of the second rolling metal mold, and quadriangular pyramids 622 with a flat bottom portion 622a formed by the second groove 512 of the first rolling metal mold and by the second groove 512 of the second rolling metal mold, the flat bottom portion 622a being larger than the above-described bottom portion 621a. The pattern of the protruding and recessed portions 620, also has a second pattern columns R2 having quadriangular pyramids 623 with a protrusion 623a formed by the first groove 511 of the first rolling metal mold and the first groove 511 of the second rolling metal mold, and quadriangular pyramids 624 with a flat bottom portion 624a formed by the second groove 512 of the first rolling metal mold and the first groove 511 of the second rolling metal mold. Thus, the protruding and recessed portions 620 may also be formed on the surface portion protruded in collar shape of the carrying roller 31 with the two rolling metal molds 510, 510, so that the instant film sheet 1001 is stuck at the both side portions thereof by the protrusion 623a of the protruding and recessed portions 620, and accurately and surely carried.

Figure 31:
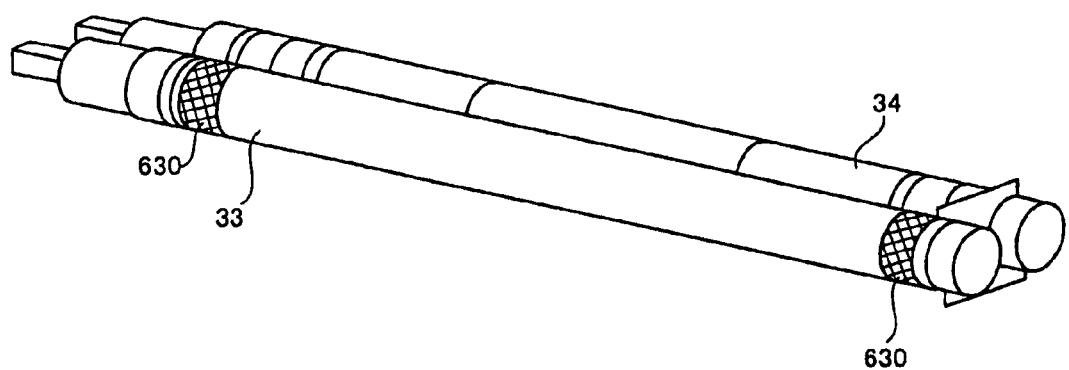
FIG. 31 is an enlarged figure showing the pair of developing rollers shown in FIG. 24.

FIG. 31 is an enlarged figure showing the pair of developing rollers shown in FIG. 24.

One developing roller 33 of the pair of developing rollers 33, 34 shown in FIG. 31 is formed with the same protruding and recessed portions 630 as the protruding and recessed portions 610 formed on the surface portion protruded in collar shape of the carrying roller 31 shown in FIG. 25. Provision of such developing rollers 33 makes it possible to suppress irregular feed of the instant film sheet 1001 to a small extent, as in the carrying roller 31. Since the protruding and recessed portions 630 are formed to the developing roller 33 by the form rolling method, it is not necessary to perform complicated control and processing steps of abrasive grains as compared with the case where the protruding and recessed portions are formed to the developing roller by the sandblasting, as a result of which the machining step of the developing roller 33 can be simplified and the cost can be reduced.

In the present embodiment, an example in which the carrying roller 31 and the developing roller 33 is formed with the protruding and recessed portions 610 (or 620), 630 is described, but the present invention is not limited to the embodiment described above, and an embodiment may also be included within the scope of the present invention, in which at least one of the pair of carrying rollers has a surface shape whose first protruding portions with a predetermined height are distributed, and whose second protruding portions with a height lower than that of the first protruding portion and with a volume larger than that of the first protruding portion are distributed between the respective first protruding portions.

Further, in the present embodiment, the printer 1 which writes by photoirradiation a latent image on the instant film sheet 1001 on which an image is to be recorded, while carrying the instant film sheet 1001, and which performs development by crushing the developer pool 1001a and spreading the developer, is described, but the present invention is not limited to the embodiment described above, and a printer may also be included within the scope of the present invention, which writes by photoirradiation a latent image in a recording medium in which an image is to be recorded, and which performs development by crushing the developer pool and spreading the developer.

Further, in the present embodiment, the image recording apparatus according to the present invention, which delivers recording media in the medium pack chamber loaded in the pack chamber one by one, and which records an image on the recording medium by writing the image while carrying the recording medium in a predetermined carrying direction, is described by way of an example of the printer, but the image recording apparatus according to the present invention is not limited to the embodiment described above, and a camera may also be included within the scope of the present invention, in which the recording medium in the medium pack is a photosensitized material, and which photographs on the recording medium in the medium pack chamber loaded in the pack chamber and discharges the photographed recording medium.

What is claimed is:

1. An image recording apparatus that has a pack chamber loaded with an instant film pack storing by stacking a plurality of pieces of instant film sheets having an image recording section which is exposed and subjected to spreading of a developer to record an image and a developer pool provided on a front end side in a carrying direction from the image recording section, and that carries the instant film sheets stored in the instant film pack loaded in the pack chamber and that performs recording of the image on the instant film sheets, the image recording apparatus comprising:

carrying rollers carrying one instant film sheet taken out from the instant film pack loaded in the pack chamber;
   an exposure section exposing the instant film sheet being carried by the carrying rollers;
   developing rollers provided on a downstream side in the carrying direction from the carrying rollers, crushing the developer pool of the instant film sheet being carried and spreading the developer over the image recording section;
   a carrying roller holding section receiving and holding the carrying rollers; and
   a developing roller holding section that receives and holds the developing rollers and that is constituted by a second component separate from a first component constituting the carrying roller holding section, the second component being fixed to the first component.

2. The image recording apparatus according to claim 1, wherein the first component is a component constituting the carrying roller holding section and the pack chamber.

3. The image recording apparatus according to claim 1, further comprising a control plate positioned between the carrying rollers and the developing rollers, and in contact with the instant film sheet being carried to control spreading of the developer, the control plate being fixed to the second component.

4. An image recording apparatus writing a latent image by photoirradiation in a recording medium which has a developer pool at a tip portion in a predetermined carrying direction, on which the latent image is formed by exposure, and which records an image visualized with the latent image subjected to spreading of a developer stored in the developer pool, and performing development by crushing the developer pool and spreading the developer, the image recording apparatus comprising:

a pair of carrying rollers carrying the recording medium by clamping both side portions of the recording medium; and
   a pair of developing rollers which is arranged on a downstream side in the carrying direction of the recording medium from the pair of carrying rollers, and which clamps the whole width of the recording medium and crushes the developer pool to spread the developer,
   at least one of the pair of carrying rollers having a surface shape in which first protruding portions having a predetermined height are distributed, and in which second protruding portions having a height smaller than the height of the first protruding portions and a volume larger than the volume of the first protruding portions are distributed between the respective first protruding portions.

5. The image recording apparatus according to claim 4, wherein the first protruding portion has a tapered shape.

6. The image recording apparatus according to claim 4, wherein the second protruding portion has a sharp tip truncated shape.

7. The image recording apparatus according to claim 4, wherein at least one of the pair of the developing rollers has a surface shape in which the first protruding portions having a predetermined height are distributed in portions clamping both side portions of the recording medium, and in which the second protruding portions having a height lower than the height of the first protruding portions and a volume larger than the volume of the first protruding portions are distributed between the respective first protruding portions.

* * * * *